US012775751B2

(12) United States Patent
Blackwell, II et al.

(10) Patent No.: US 12,775,751 B2
(45) Date of Patent: Oct. 27, 2026

(54) GENERATING OPERATIONAL AND REALISTIC MODELS OF PHYSICAL SYSTEMS

(71) Applicant: INDUSTRIAL TECHNOLOGY AND SAFETY COUNCIL LLC, Seabrook, TX (US)

(72) Inventors: John A. Blackwell, II, Houston, TX (US); Joshua M. Chapman, Golden, CO (US)

(73) Assignee: INDUSTRIAL TECHNOLOGY AND SAFETY COUNCIL LLC, Seabrook, TX (US)

( * ) Notice: Subject to any disclaimer, the term of this patent is extended or adjusted under 35 U.S.C. 154(b) by 994 days.

(21) Appl. No.: 17/459,608

(22) Filed: Aug. 27, 2021

(65) Prior Publication Data

US 2022/0067233 A1 Mar. 3, 2022

Related U.S. Application Data

(60) Provisional application No. 63/071,248, filed on Aug. 27, 2020.

(51) Int. Cl.
*G06F 30/13* (2020.01)
*G06F 113/14* (2020.01)

(52) U.S. Cl.
CPC .......... *G06F 30/13* (2020.01); *G06F 2113/14* (2020.01)

(58) Field of Classification Search
CPC ....... G06F 30/18; G06F 2113/14; G06F 30/13
See application file for complete search history.

(56) References Cited

U.S. PATENT DOCUMENTS

2017/0337299 A1* 11/2017 Tang ...................... G06Q 50/08
2019/0129397 A1* 5/2019 Horiwaki ......... G05B 19/41885
2022/0121965 A1* 4/2022 Chatterji ................ G06F 16/23

OTHER PUBLICATIONS

Son, Hyojoo, Changmin Kim, and Changwan Kim. "3D reconstruction of as-built industrial instrumentation models from laser-scan data and a 3D Cad database based on prior knowledge." Automation in Construction 49 (2015): 193-200 (Year: 2015).*

(Continued)

*Primary Examiner* — David A Hopkins
(74) *Attorney, Agent, or Firm* — Dorsey & Whitney LLP

(57) ABSTRACT

An exemplary method of generating a model of a physical environment includes generating a physical model of the physical environment using measured data from the physical environment, where the physical model includes spatial data about objects in the physical environment, correlating the physical model of the physical environment with a process model including components in the physical environment and interconnections between the components reflecting connections between the components in the physical environment, and generating the model of the physical environment by correlating the physical model of the physical environment with components of the process model based on information from a relational model associated with the physical environment, where the relational model includes probability distributions regarding component attributes of the components and relationships between components.

19 Claims, 9 Drawing Sheets

(56) References Cited

OTHER PUBLICATIONS

Martinez, Gerardo Santillan, et al. "Automatic generation of a simulation-based digital twin of an industrial process plant." IECON 2018—44th Annual Conference of the IEEE Industrial Electronics Society. IEEE, 2018 (Year: 2018).*
Sierla, Seppo, et al. "Towards semi-automatic generation of a steady state digital twin of a brownfield process plant." Applied Sciences 10.19 (2020): 6959 (Year: 2020).*
Kalasapudi, Vamsi Sai, Yelda Turkan, and Pingbo Tang. "Toward automated spatial change analysis of MEP components using 3D point clouds and as-designed BIM models." 2014 2nd International Conference on 3D Vision. vol. 2. IEEE, 2014 (Year: 2014).*
Czerniawski, Thomas. Updating digital models of existing commercial buildings using deep learning. Diss. 2020 (Year: 2000).*
Rausch, Chris, et al. "Computational algorithms for digital twin support in construction." Construction Research Congress 2020. Reston, VA: American Society of Civil Engineers, 2020. (Year: 2020).*
Cho, Chi Yon, Xuesong Liu, and Burcu Akinci. "Automated building information models reconstruction using 2D mechanical drawings." Advances in Informatics and Computing in Civil and Construction Engineering: Proceedings of the 35th CIB W78 2018 Conference: IT in Design, Construction, and Management. (Year: 2018).*
Son, Hyojoo, and Changwan Kim. "Automatic segmentation and 3D modeling of pipelines into constituent parts from laser-scan data of the built environment." Automation in Construction 68 (2016): 203-211 (Year: 2016).*
Son, Hyojoo, Frederic Bosche, and Changwan Kim. "As-built data acquisition and its use in production monitoring and automated layout of civil infrastructure: A survey." Advanced Engineering Informatics 29.2 (2015): 172-183 (Year: 2015).*
Flynn, Patrick J., and Anil K. Jain. "CAD-based computer vision: from CAD models to relational graphs." Conference Proceedings., IEEE International Conference on Systems, Man and Cybernetics. IEEE, 1989 (Year: 1989).*
Perez, Yeritza. Semantically-rich as-built 3D modeling of the built environment from point cloud data. Diss. University of Illinois at Urbana-Champaign, 2020 (Year: 2020).*
Mohamed, Ahmed Gouda, Mohamed Reda Abdallah, and Mohamed Marzouk. "BIM and semantic web-based maintenance information for existing buildings." Automation in Construction 116 (2020) (Year: 2020).*
Kwon, Soon-Wook-Bosche, and Youngki Frederic-Huh. ""Model Spell Checker" for Primitive-Based As-Built Modeling in Construction." Korean Journal of Construction Engineering and Management. Volume 5 Issue 5 Serial No. 21 / pp. 163-171 / 2004. (Year: 2004).*
Frebet, V., et al. "Interactive semantics-driven reconstruction methodology from Point Clouds." 29th CIRP Design 2019 Open Design and Design as Exponential Technology. 2019. Abstract, §§ 1-1.1. 2.1, then see §§ 2.1-2.3, 2.3.2, 2.4, and 3. (Year: 2019).*
Holi, Pavitra, et al. "Intelligent reconstruction and assembling of pipeline from point cloud data in smart plant 3D." Advances in Multimedia Information Processing—PCM 2015: 16th Pacific-Rim Conference on Multimedia, Gwangju, South Korea, Sep. 16- 18, 2015. Abstract, § 1 (Year: 2015).*
Kim, Hyungki, et al. "Deep-learning-based retrieval of piping component catalogs for plant 3D CAD model reconstruction." Computers in Industry 123 (2020): 103320 (Year: 2020).*
Moisan, Emmanuel, et al. "Integration of TLS and sonar for the modelling of semi-immersed structures." Laser Scanning. CRC Press, 2019. 151-167 (Year: 2019).*
Elfes, Alberto. "Sonar-based real-world mapping and navigation." IEEE Journal on Robotics and Automation 3.3 (1987): 249-265 (Year: 1987).*
Howard, Andrew, and Les Kitchen. "Sonar mapping for mobile robots." (Technical Report 96/34), (1997), Department of Computer Science, University of Melbourne (1997). (Year: 1997).*
Rausch, Christopher, et al. "Monte Carlo simulation for tolerance analysis in prefabrication and offsite construction." Automation in Construction 103 (2019): 300-314. (Year: 2019).*
Sierla, Seppo, Mohammad Azangoo, and Valeriy Vyatkin. "Generating an industrial process graph from 3d pipe routing information. " 2020 25th IEEE International Conference on Emerging Technologies and Factory Automation (ETFA). vol. 1. IEEE, 2020. (Year: 2020).*
Sierla, Seppo, et al. "Integrating 2D and 3D digital plant information towards automatic generation of digital twins." 2020 IEEE 29th international symposium on industrial electronics (ISIE). IEEE, 2020. (Year: 2020).*
Wang, Boyu, et al. "Fully automated generation of parametric BIM for MEP scenes based on terrestrial laser scanning data." Automation in Construction 125 (2021): 103615 (Year: 2021).*
Chen, Weiwei, Keyu Chen, and Jack CP Cheng. "Towards an ontology-based approach for information interoperability between BIM and facility management." Workshop of the European group for intelligent Computing in engineering. Cham: Springer International Publishing, 2018. Abstract, § 3.1 (Year: 2018).*
El Abri, Marwa. Probabilistic relational models learning from graph databases. Diss. Université de Nantes, 2018. Abstract, §§ 1.1.1-1.1.2, 3.1, 4.4.1, 5.2-5.2.1. (Year: 2018).*
Getoor, Lise, et al. "Learning probabilistic relational models." Relational data mining (2001): 307-335. Abstract, § 1 (Year: 2001).*
Huet, Benoit, and Edwin R. Hancock. "Relational object recognition from large structural libraries." Pattern Recognition 35.9 (2002): 1895-1915. Abstract, §§ 1-1.2, 2.1-2.3, 3 (Year: 2002).*
Kalasapudi, Vamsi Sai. Automatic Change-based Diagnosis of Structures Using Spatiotemporal Data and As-Designed Model. Diss Arizona State University, 2017. Abstract, pp. 37-53. Abstract, pp. 3-6 (Year: 2017).*
Kalasapudi, Vamsi Sai, and Pingbo Tang. "Automated tolerance analysis of curvilinear components using 3D point clouds for adaptive construction quality control." Computing in Civil Engineering 2015. 2015. 57-65. (Year: 2015).*
Lee, Joohyuk, et al. "Skeleton-based 3D reconstruction of as-built pipelines from laser-scan data." Automation in construction 35 ( 2013): 199-207. Abstract, §§ 1-3.1, and 3.2.2 (Year: 2013).*
Nahangi, M., et al. "Arbitrary 3d object extraction from cluttered laser scans using local features." ISARC. Proceedings of the International Symposium on Automation and Robotics in Construction. vol. 33. IAARC Publications, 2016. Abstract, §§ 1, 2.1-2.2, then see 3. (Year: 2016).*
Nguyen, Cong Hong Phong, and Young Choi. "Comparison of point cloud data and 3D Cad data for on-site dimensional inspection of industrial plant piping systems." Automation in Construction 91 (2018): 44-52. Abstract, §§ 1-2 and 3.2.2 (Year: 2018).*
Oliva, G. Medina, et al. "Use of probabilistic relational model (PRM) for dependability analysis of complex systems." IFAC Proceedings vols. 43.8 (2010): 501-506. Abstract, §§ 1-4 (Year: 2010).*
Rausch, Christopher, et al. "Kinematics chain based dimensional variation analysis of construction assemblies using building information models and 3D point clouds." Automation in Construction 75 (2017): 33-44. Abstract, §§ 1-3 and 4.3 (Year: 2017).*
Son, Hyojoo, Changmin Kim, and Changwan Kim. "Automatic 3D reconstruction of as-built pipeline based on curvature computations from laser-scanned data." Construction Research Congress 2014: Construction in a Global Network. 2014. Abstract, introduction. (Year: 2014).*
Son, Hyojoo, Changmin Kim, and Changwan Kim. "Fully automated as-built 3D pipeline extraction method from laser-scanned data based on curvature computation." Journal of Computing in Civil Engineering 29.4 (2015): B4014003. Abstract, Introduction (Year: 2015).*
Tang, Pingbo, Z. Shen, and R. Ganapathy. "Automated spatial change analysis of building systems using 3D imagery data." Proceedings of the 30th CIB W78 International Conference. 2013. Abstract, §§ 1, 2.1-2.2, 3, 4. (Year: 2013).*

(56) References Cited

OTHER PUBLICATIONS

Tang, Pingbo, et al. "A Spatial-Context-Based Approach for Automated Spatial Change Analysis of Piece-Wise Linear Building Elements." Computer-Aided Civil and Infrastructure Engineering 31.1 (2016): 65-80. Abstract, §§ 1, 2.2-2..2.1, 3 (Year: 2016).*

Tang, Pingbo, et al. "A Spatial-Context-Based Framework for Automated Spatial Change Analysis of Curvilinear Building Elements." (2014). Abstract, §§ 1, 3 (Year: 2014).*

Xiao, Ya-Qi, Sun-Wei Li, and Zhen-Zhong Hu. "Automatically generating a MEP logic chain from building information models with identification rules." Applied Sciences 9.11 (2019): 2204. Abstract, §§ 1-2.2, 3. (Year: 2019).*

Zeibak-Shini, R., Rafael Sacks, and Sagi Filin. "Toward generation of a building information model of a deformed structure using laser scanning technology." 14th International Conference on Computing in Civil and Building Engineering (ICCCBE). 2012. Abstract, §§ 1-2.2.3 (Year: 2012).*

Hassan, Amin Talha, and Dieter Fritsch. "Integration of laser scanning and photogrammetry in 3D/4D cultural heritage preservation—a review." International Journal of Applied 9.4 (2019): 16. (Year: 2019).*

Izadinia, Hamid, Qi Shan, and Steven M. Seitz. "Im2cad." Proceedings of the IEEE conference on computer vision and pattern recognition. 2017 (Year: 2017).*

Kermani, Z. Sadeghipour, et al. "Learning 3D Scene Synthesis from Annotated RGB-D Images." Computer Graphics Forum. vol. 35. No. 5. 2016 (Year: 2016).*

Lahoud, Jean, and Bernard Ghanem. "2d-driven 3d object detection in rgb-d images." Proceedings of the IEEE international conference on computer vision. 2017 (Year: 2017).*

Ren, Zhile, and Erik B. Sudderth. "Clouds of oriented gradients for 3D detection of objects, surfaces, and indoor scene layouts." IEEE Transactions on Pattern Analysis and Machine Intelligence 42.10 (2019): 2670-2683 (Year: 2019).*

Silberman, Nathan. Reasoning about Object Instances, Relations and Extents in RGBD Scenes. Diss. New York University, 2015 ( Year: 2015).*

Song, Shuran, Samuel P. Lichtenberg, and Jianxiong Xiao. "Sun rgb-d: A rgb-d scene understanding benchmark suite." Proceedings of the IEEE conference on computer vision and pattern recognition. 2015 (Year: 2015).*

Wald, Johanna, et al. "Learning 3D Semantic Scene Graphs From 3D Indoor Reconstructions." 2020 IEEE/CVF Conference on Computer Vision and Pattern Recognition (CVPR). IEEE, 2020 (Year: 2020).*

Zollhofer, Michael, et al. "State of the art on 3D reconstruction with RGB-D cameras." Computer graphics forum. vol. 37. No. 2. 2018 (Year: 2018).*

Amazon, "What is a Graph Database", URL: aws(dot)amazon(dot)com/nosql/graph/, accessed via WayBack machine with an archive date of Feb. 2017 (Year: 2017).*

* cited by examiner

GENERATING OPERATIONAL AND REALISTIC MODELS OF PHYSICAL SYSTEMS

CROSS-REFERENCE TO RELATED APPLICATIONS

The present application claims priority under 35 U.S.C. § 119 to U.S. Provisional Application No. 63/071,248 entitled "Generating Operational and Realistic Models of Physical Sites," filed on Aug. 27, 2020, which is hereby incorporated by reference herein in its entirety.

BACKGROUND

Training personnel to safely manage and use operation systems requires many hours of human labor and on-hand experts to walk new personnel through knowledge of the environment. Detailed knowledge of the environment, operation of equipment within the environment, and safety protocols are important for personnel safety. Such knowledge must be passed down from employee to employee, creating bottlenecks in knowledge and preventing or hindering succession planning. Further, maintenance or repair of equipment, typically requires an expert to be physically present at a location, which for some physical sites that may be remote or difficult to access, means that it may take days or weeks for equipment to be repaired, resulting in downtime and lost revenue, as well as potential safety issues.

Complex systems may also include organic systems such as forests, and hybrid systems such as cities and parks. Efficient and effective operations and planning for large scale events in these environments, such as wildfires and floods is critical to the safety of society. Current technologies may have limited capacities to model and simulate the scale and scope of such complex environments, which limits training and both predictive and real-time situation analysis for these types of events in these environments. The capability to simulate possible future conditions and include both human and machine perspective in such systems provides opportunities to prepare efficiently and effectively for these events.

SUMMARY

An exemplary method of generating a model of a physical environment includes generating a physical model of the physical environment using measured data from the physical environment, where the physical model includes spatial data about objects in the physical environment; correlating the physical model of the physical environment with a process model including components in the physical environment and interconnections between the components reflecting connections between the components in the physical environment; and generating the model of the physical environment by correlating the physical model of the physical environment with components of the process model based on information from a relational model associated with the physical environment, where the relational model includes probability distributions regarding component attributes of the components and relationships between components.

An example system for generating a digital twin of physical environment includes a relational model comprising probability distributions regarding attributes of components in the physical environment and relationships between the components; a semantic model generated based on a correlation between a physical model of the physical environment including spatial data about objects within the physical environment and a process model including the components of the physical environment and interconnections between the components reflecting connections between the components in the physical environment, where the correlation between the physical model and the process model in based on the relational model; and a model library including parametric models of the components, where the digital twin is generated using the semantic model and the parametric models of the components.

Exemplary computer readable media may be encoded with instructions which, when executed by one or more processors, cause the one or more processors to perform a process including: generating a physical model of the physical environment using data collected from the physical environment, where the physical model includes spatial data about objects in the physical environment; generating a semantic model of the physical environment by correlating the objects in the physical model of the physical environment with components which may be located in the physical environment based on information from a relational model associated with the physical environment, where the relational model includes probability distributions regarding component attributes of the components and relationships between components in the physical environment; and generating a digital twin of the physical environment using the semantic model and a model library including models corresponding to the components, where the models corresponding to the components include information allowing the digital twin to reflect real-life characteristics of the components.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1A:
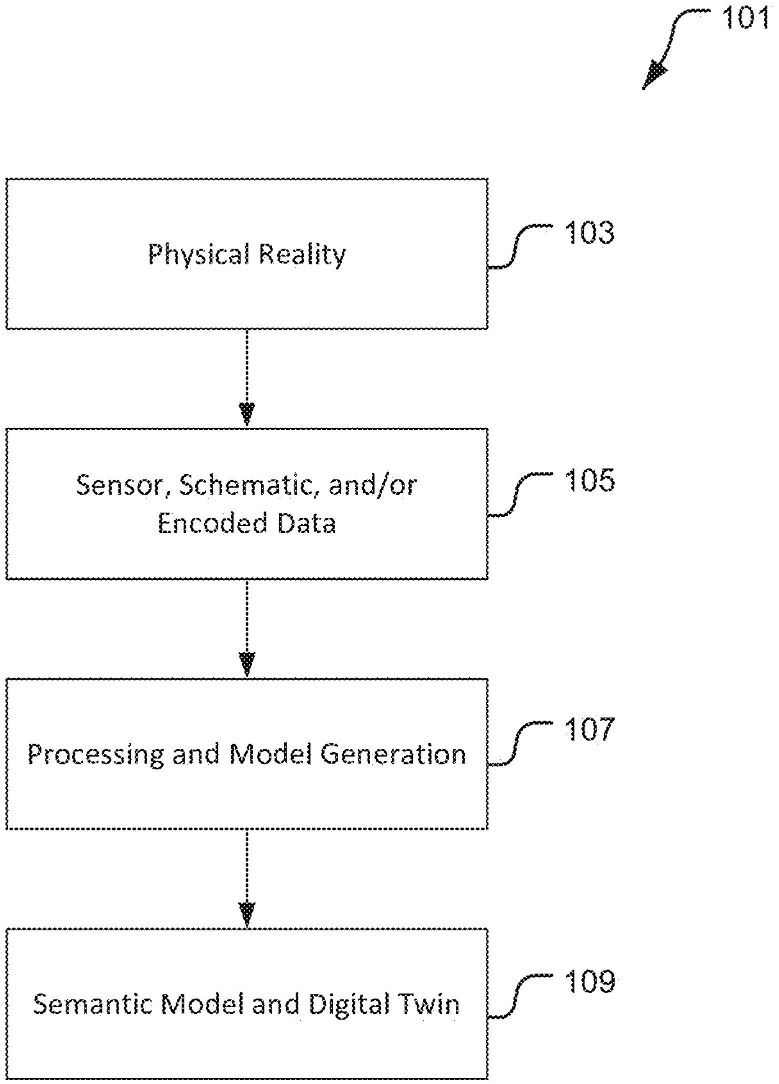
FIG. 1A illustrates an example diagram for generating a digital twin of a physical environment.

The present disclosure relates generally to systems and methods that can generate digital twins of physical sites, including equipment, and the like, as well as natural systems such as forests, or environments such as city blocks. A digital twin provides an accurate computerized model of a physical environment, such as a chemical operation environment, oil refinery, other industrial environment, and/or natural environment (e.g., forest, national park, or the like). Digital twins may, for example, employ computer assisted design (CAD) models of components within these environments and may be presented in two dimensions or in three dimensions. A digital twin may also allow for realistic interaction with components of a system (e.g., turning wheels, flipping switches or levers, or pressing buttons) and simulating consequences of those interactions. In this manner, digital twins can be created that are realistic and reflect the real-world conditions of the physical site and equipment. The digital twins can, accordingly, be used for a variety of purposes including, training, maintenance, repair, inspections, and so on. Conventionally, processes used for the creation of digital twins for process operation systems may be prohibitively expensive, difficult, and inaccurate to the actual real-world conditions. For example, such modeling has been done manually using skilled modelers to recreate each component of a system by hand, leading companies to forego the use of training personnel using digital twins. As such, the full benefits of digital twins for a variety of use cases has not been exploited.

For example, training operators and employees using spatial computing technology, such as augmented reality, virtual reality, mixed reality (AR/VR/MR) or other technology employing simulation-ready virtual models (e.g., digital twins) of process operation systems may reduce errors in actual operation, leading to safer operating environments and reduction of catastrophic environmental risks. As used herein, spatial computing technology may encompass various processes in which some or all data is associated with a position and orientation in a real or virtual three dimensional space, and may include, for example, AR/VR (which may include extended reality (XR), mixed reality (MR) and hyper reality) and database architectures and computational networks that have capacity to interact with information in a spatial context.

Digital twins may be also used to assist operators and employees in performing tasks. For example, when used in conjunction with AR, a digital twin may track where an operator is within an environment and may present instructions, reference information, etc. relevant to components near the operator. Training operators using digital twins using AR/VR may include using virtual reality or a mix of AR and VR. For example, operators may be trained to carry out various routines or checklists in a VR environment. In some implementations, AR may be used within the VR environment. For example, prompts (similar to prompts presented using AR in a physical environment) may be presented in a VR environment. Digital twins may also be used, for example, for testing, safety, continuing education, collaboration, engineering, remote subject expert utilization (e.g., allowing a subject matter to remotely diagnosis issues), troubleshooting, visualization of internet of things (IoT) data, robotic and surveillance perspectives, viewing historical and/or predictive trends, hyper vision (e.g., viewing data and spectrum information beyond human perceptual capacity graphed within human perceptual capacity, such as, UV, thermal, or gas detection represented by colors), live assistance in the field (either by providing data, real time information from an AI system, human, or the like), and the like among other possible uses.

Embodiments herein include generation of digital twins using information generated from a scan of the environment (e.g., gathering information about a physical environment through various combinations of sensors and/or imaging data), diagrams of the environment or process, and optionally institutional or domain knowledge, that allow for efficient and realistic creation of a digital twin of a physical environment or site. For example, the various information collected may be combined into a semantic model of the environment, where the semantic model includes information about the components of the environment and spatial relationships between various components in the environment. The semantic model may then be used to generate a digital twin by selecting and placing models (e.g., CAD models) representing the various components in the environment in the digital twin of the environment. In some examples, components in the digital twin may contain description files and/or code that enable simulation of the respective components' functional roles within the simulated system including interfacing with other components in the system.

A digital twin may be updated as changes are made to the physical environment. For example, where a component is changed out for a newer version, the semantic model may be updated to include the newer version of the component representation such that the digital twin can be updated quickly, without a full re-generation of the digital model. Further, the digital twin may include and functionality of components in the physical environment, such that personnel may be trained to simulate responses to emergency situations and may immediately see the consequences of various responses within the simulation environment. The digital twin can also be modified to include feedback from personnel, such as on-site operators and engineers, which may help to ensure that the digital twin is accurate and realistic. Further, a digital twin may be updated to include additional data for individual components. For instance, a gate valve may initially be presented in the digital twin as an exterior only model. When updated, the model may allow full disassembly of the gate valve or provide "x-ray" vision or other transparency options, such as a three-dimensional explosion diagram, to allow the user to view the inner workings of the gate valve. Such component updates may be implemented by adding a sub-node to a component within the semantic model, without re-generating the semantic model from scratch. Such sub-nodes may themselves have all or some of the property types of the original node, including further sub-nodes. Sub-nodes may, in some examples, be toggled on or off to be integral functions in the simulation or may be bypassed through functions of a parent or super node.

FIG. 1A illustrates an example diagram for generating a digital twin of a physical environment. Various inputs and processes may be used to generate a semantic model and/or a digital twin 109 starting from a physical reality 103 of the physical environment. The digital twin 109 allows various aspects of the physical environment to be experienced in a realistic manner, allowing humans to interact virtually with a realistic representation of the environment, manipulate the physical system by interacting virtually with the digital twin, interact with the real environment while having an aligned digital reference which may change their own perception or provide situational awareness to computational systems, and/or provide software solutions to issues or the like of the physical environment, including automated systems which may be trained on the digital twin and robotic assets which may interact with the physical environment by referencing the digital twin. For example, the digital twin 109 may be used in conjunction with AR/VR or other spatial computing systems to train operators to effectively operate within the physical environment. In some examples, the digital twin 109 can be used to familiarize new personnel with the function and layout of a system, without requiring the personnel to be present in the physical environment. The digital twin 109 may also be used to train personnel by simulating emergency scenarios in a VR environment using the digital twin 109 and training and testing personnel on the appropriate response (e.g., shutting off the appropriate equipment in case of fire).

The digital twin 109 may be generated using various models of the physical environment to create a high-fidelity interactive simulation of the environment. For example, the digital twin 109 may be generated using one or more of physical information represented in a physical model such as a spatial database, process information represented in a process model, and/or domain knowledge represented in a relational model. Machine trained algorithms may be used to expedite and allow automated generation of a digital twin 109 that accurately reflects the as-built reality of a physical environment. Where human input is used, the human input may be reduced to making key decisions, reducing the amount of human involvement in the generation of the digital twin 109, resulting in cost and time savings.

Sensor, schematic, and/or encoded data 105 may include various types of data about the physical environment which may be used in conjunction with the physical reality 103 to generate the semantic model and digital twin 109. Sensor, schematic, and/or encoded data may be referred to as measured data in some examples. For example, sensor data may include data obtained through a scan of the physical environment being modeled, which may be used to create a spatial database or other physical model of the environment. Generally, a physical model of the environment may include spatial data about objects within the physical environment. Schematic or encoded data may be used, in some examples, to create a process model of the environment and may include various representational information about the information such as process diagrams, schematic diagrams, plans, maps, 3D models, written explanations of the environment, and the like. For example, a process model may include the components in the environment and some representation and/or information about connections between the components in the environment.

Processing and model generation 107 generally generates a semantic model and digital twin 109 from the various sensor, schematic, and/or encoded data 105 provided about the physical reality 103 being modeled. The methods and/or modules used in processing and model generation 107 may vary depending on the types of data provided about the physical environment, intended uses of the digital twin, and/or other parameters. In various examples, processing and model generation 107 may include one or more of machine trained algorithms (e.g., machine learning models), procedural algorithms, and human input (human-in-the-loop). For example, a machine learning or machine trained algorithm may attempt to match sensor data about a physical environment to data obtained through schematics of the physical environment and, where the algorithm is unable to match or reconcile the data, a procedural algorithm or human-in-the-loop may provide additional context to generate the digital twin 109.

Once generated, the digital twin 109 may allow for realistic experience of various aspects of the modeled physical environment, allowing humans, machines, and/or digital systems to interact with the environment and/or provide solutions to issues presented in the environment. In some examples, the digital twin 109 may be used as a predictive simulation system to analyze the impact of changes in parameters over time.

Figure 1B:
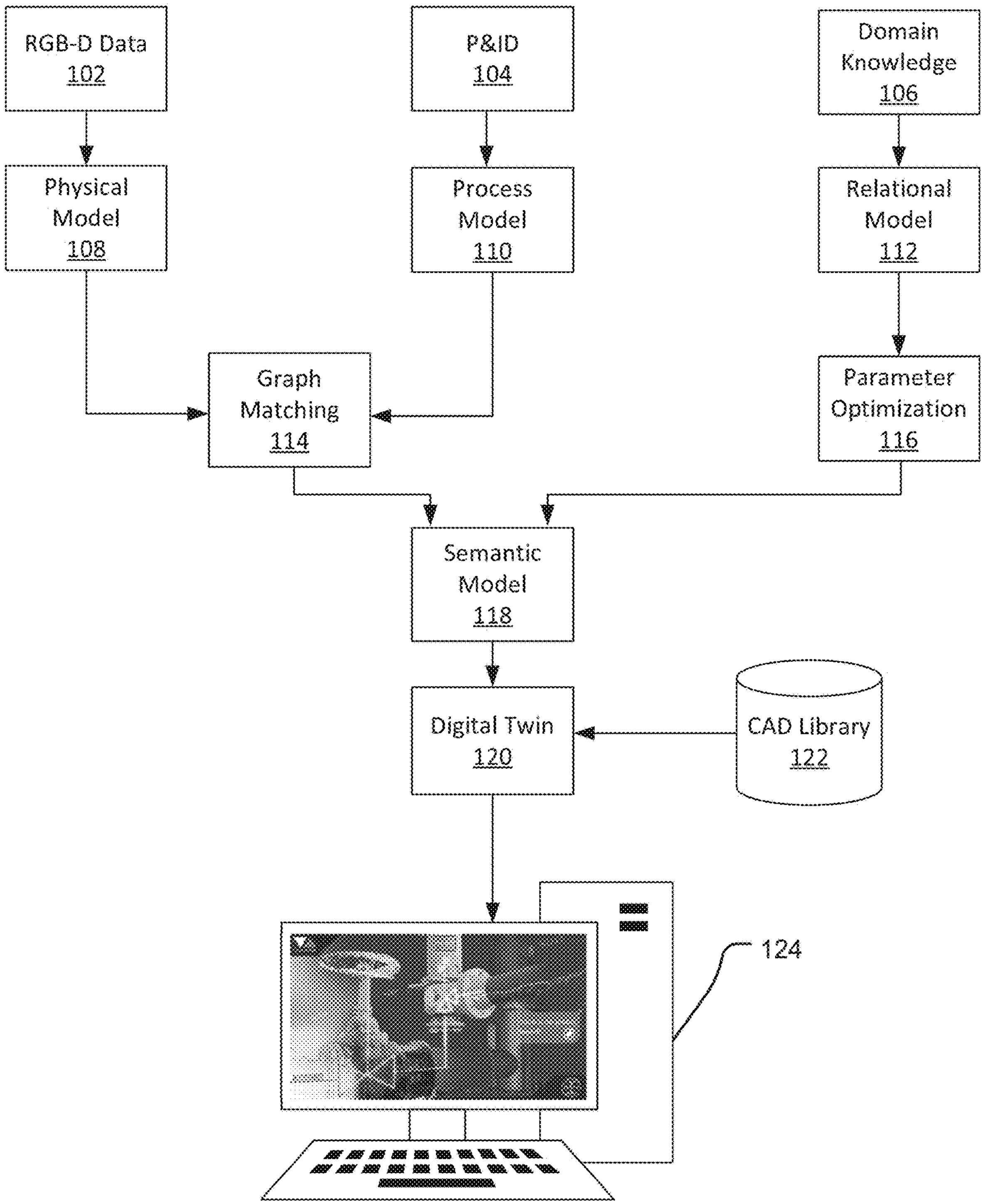
FIG. 1B illustrates an example diagram of a system for creating a digital twin of a physical environment.

FIG. 1B illustrates an example diagram of a system for creating a digital twin 120 of a physical environment. The example diagram shown in FIG. 1B may be an example implementation of the diagram shown in FIG. 1A.

To create a digital twin 120 of a physical environment, a physical environment may be mapped to create image data, such as RGB-D data 102, which generally includes image (e.g., color data, such as red, green, blue pixel information) and depth data to map the physical environment. The RGB-D data 102 (or other image data) is then used to generate a physical model 108 of the physical environment. The RGB-D data 102 may be collected using, for example LiDAR and an RGB camera. The RGB-D data 102 may be treated separately or registered as aligned color and depth data for the environment. For example, in one implementation, the RGB-D data 102 may include both photo-aligned LiDAR depth maps projected as a normalized, colorized point cloud and high resolution base RGB images with localizable perspective pose within the point cloud. In some implementations, the raw data may be processed without spatially registering the data sets, either independently analyzing each data set or batching them in relation to their time of recording. The depth and image data may be registered to each other to generate the physical model 108. In various implementations, generation of the physical model may include use of a computer vision algorithm, human-in-the loop, or other methods or algorithms to identify objects in the environment from the RGB-D data 102. This identification may occur independently of other data sources or within probabilistic constrained search spaces provided by other models and information such as the process and/or relational model. This identification may occur on a component-by-component basis, traversing or "crawling" through the system, or as the recognition of components within the data regardless of their respective role within the process.

Figure 2:
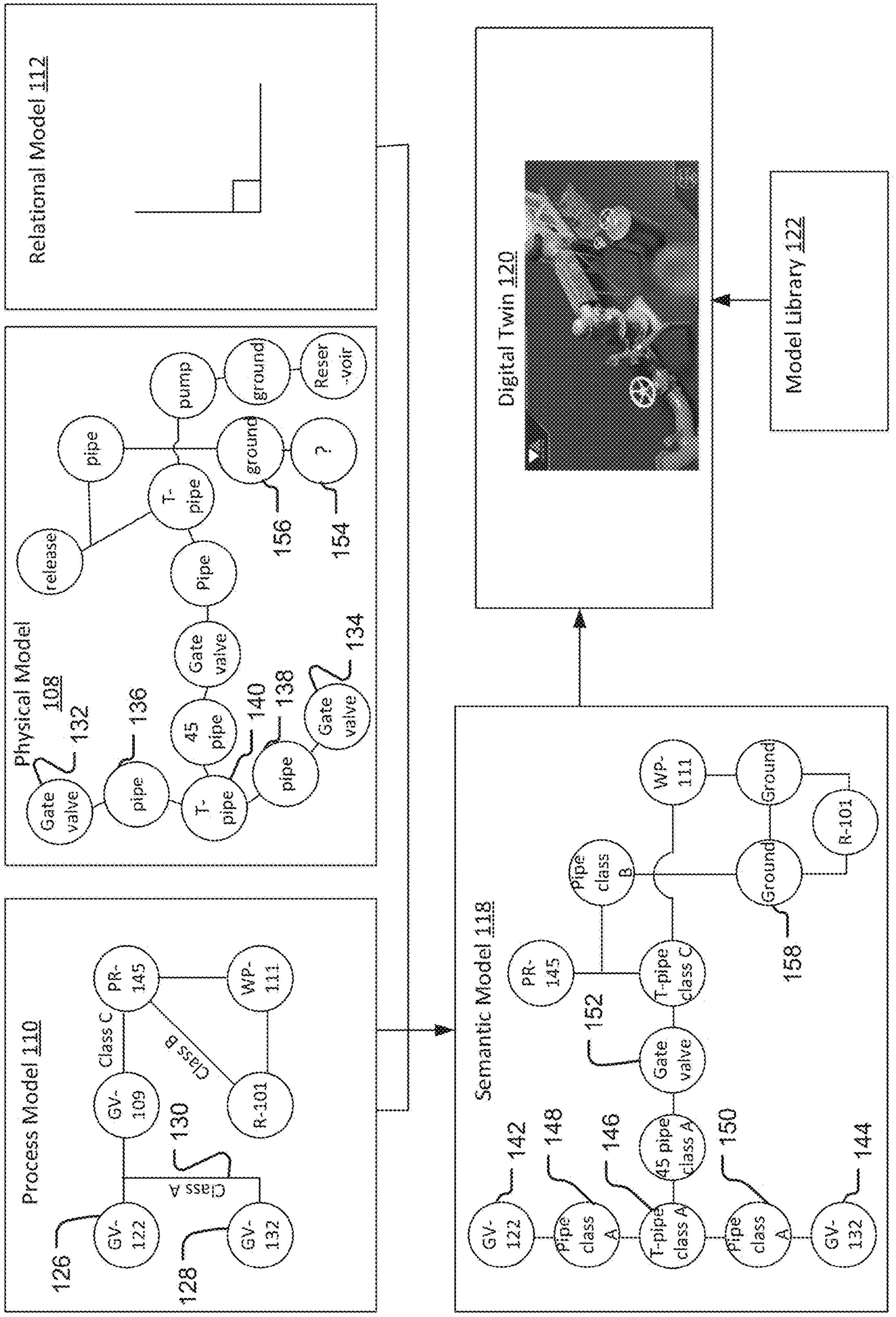
FIG. 2 illustrates example models used to generate a digital twin of a physical environment.

The physical model 108 may be generated from RGB-D data 102 and may be, as shown in FIG. 2, represented as a graph. However, it should be noted that various types of storage structures and encoded data may be used, such as, but not limited to, graph and other database structures, SQL databases and the like. In addition to vertices for components, the physical model 108 may include additional vertices for specific sections of pipe (which may be treated as components) and infrastructure such as stairs, walkways, connectors, and ground plane information. For example, the physical model 108 includes vertices 132 and 134 representing gate valves, as well as vertices 136, 138, and 140 representing pipe segments connecting the gate valves. In addition to items in the physical environment, in some cases the physical model 108 may include vertices for general type descriptions and configurations of components, or spatial regions which may define empty space or space that includes one or multiple other vertices within it. Attributes of the vertices of the physical model 108 may include any attributes that can be extracted from real-world sensors such as the appearance, shape, position, orientation, size, and color of components or connections of the physical environment. The attributes may be generated using RGB data, depth data, other electromagnetic spectrum information, internet of things (IoT) sensors, or combinations of these sources. For example, a pipe's diameter may be calculated by the number of pixels between its apparent width given the relative camera pose or by a circumference of a circle of best fit in the point cloud divided by $\pi$.

The process model 110 may be generated from a plan or diagram of the physical space, which may be an engineering drawing, architectural drawing, or other diagram such as a process and instrumentation diagram (P&ID) 104, circuit diagrams, and the like. A P&ID may include standard symbols and legends that can be extracted from the P&ID to generate the process model 110. As shown in FIG. 2, the data available in a P&ID can be modeled as a graph database in which vertices represent components and edges represent the connections between components, though other types of encoded data and storage structures may be used in various implementations. In addition to unique identifiers (labels) for components and connecting paths, other extracted information may be added to the model as vertex and edge attributes. For example, direction of flow, pipe class, sizing, and pressure rating may all be indexed as vertex or edge attributes. Components in the diagram may contain additional information stored as vertex attributes, including, for example, observational information such as the total number of connections to a component.

The relational model 112 may include information about standard configurations and attributes of a typical process operation environment, which may be domain knowledge 106. Domain knowledge 106 may include information not included in the P&ID 104 but generally known to human operators, derived from statistics, or known principles in plant design. For example, the knowledge that most pipes run in a straight line either parallel or perpendicular to the ground plane may be included as domain knowledge 106. The relational model 112 generally encodes the domain knowledge 106 to specify constraints on component attributes and relationships. In some implementations, the constraints may be represented as probability distributions. For example, for a pipe angle radius attribute, the relational model 112 may include that P(45°)=0.05, P(90°)=0.94, and P(Other Angle)=0.01, conveying that where a pipe changes direction, there is a 94% probability the angle radius is 90°, a 5% probability the angle radius is 45°, and a 1% probability the angle radius is an angle besides 450 or 90°. Additionally, constraints may be represented as continuous probability distributions or encoded as mathematical functions. For example, a function may take position, rotation, and other relevant information about parts as input and may output a relative likelihood or probability. Other attributes in the relational model may include, for example, a probability that the diameter of core piping changes without a reducer or a set of likely orientations of the primary body axis and flow axis relative to the ground plane or infrastructure plane. The relational model may also contain the component model library either in full or through unique pattern reference. In this manner, for example, a 3D model of a gate valve may be stored as a probabilistic likelihood that a particular distribution of points in space reflect the existence of that gate valve at that location in a particular orientation and scale, or as an algorithm that compares a given subset of a point cloud to a stored 3D mesh to determine the likelihood that the point cloud contains the object represented by the mesh, and uses registration to determine the most likely position, orientation, and scale of the object within the point cloud. Similarly, a recognizable pattern of color and edges may be representative of a particular type of fern in a forest.

The semantic model 118 includes information about the environment sufficient for an automated creation of a high-fidelity interactive simulation. As shown in FIG. 2, the semantic model 118 may also be stored in a graph database, though other types of databases, such as SQL databases, may be used in various implementations. The semantic model 118 combines metric information, topology, and semantic information from the process model 110, the physical model 108, and the relational model 112. The vertices of the semantic model 118 include all components in the system, including connecting pipes and surrounding infrastructure. Edges of the semantic model 118 may describe the plane of separation between two connected components, e.g., the surface plane at which two flanges meet. Edges of the semantic model 118 may also be used to store information about functional relationships between connected components. It should be noted that depending on the type of database structure used, other elements may be used to either store and/or reference to information. Each vertex of the semantic model 118 has physical attributes (e.g., pose, shape, color) and semantic attributes (e.g., pressure rating, role, direction of process flow).

In some examples, individual components defined within the system may each fit a type, whether pre-defined or defined during the process, which may be defined by specific sets of properties (e.g. the number of inputs and outputs on the component). These definitions of individual components or defined groups of components may be referred to as isometers, meaning 'measures of likeness'. Isometers may be used to label components and narrow the search space by providing expectations for that component and how it fits within the larger system. They may also provide nodes for applying new data to the system through human-in-the-loop and machine learned processes.

The digital twin 120 may be generated using the semantic model 118 and a computer aided design (CAD) library 122 to build a precise digital model of the environment. The CAD library 122 may be a custom, parametric CAD library in which specific components (e.g., industrial components) and their variations are constructed from mathematical representations of their geometry based on simple paths and shapes augmented through a series of parametric mathematically-defined modifiers. Accordingly, models within the CAD library 122 could be procedurally modified to, for example, alter scale, individual dimensions, bolt patterns, or other characteristics of components in the environment. In some implementations, the CAD library 122 may include standardized models that may be adjusted individually within the digital twin 120. For example, manufacturers may produce models corresponding to manufactured components including all available variations, which may be available as a combined parametric model or as catalogs of non-parametric models. The CAD library 122 may also include a combination of parametric models and standardized models. Components within the CAD library 122 may be customized to, for example, match a paint pattern on the component in the environment. In some implementations, components in the CAD library 122 may be directly indexed to symbols in the P&ID 104. The CAD library may contain models, whether parametric or non-parametric, that are encoded in varying representations for interaction and rendering within the system. These models may be stored and/or generated at varying levels of detail.

Once the digital twin 120 is complete, a computing system 124 may be used to view and/or navigate through the digital twin 120. In some implementations, additional information, such as explanatory text, questions about components, procedures, or training information may be added to the digital twin 120, for example, for training. For example, the digital twin 120 may be imported into a spatial computing environment, such as a game engine, for example UNITY®, and then exported to a computing system 124, which may include an AR/VR or other spatial computing platform, for use as a training, educational, marketing, planning, or other tool associated with the environment. In some implementations, the computing system 124 may be implemented using, for example, wearable three dimensional (3D), AR/VR devices (e.g., headsets, glasses), mobile computing devices, or other computing devices capable of displaying and interacting with the digital twin 120. In various implementations, the simulations created using the digital twin 120 may be presented in two or three dimensions, depending on the computing system 124.

Once the digital twin is constructed it may be used as the framework for human-in-the-loop and machine trained algorithms to encode meaningful additional information from the sensor observations of the real-world system in relation to the digital twin 120. Sensors may include static or PTZ cameras, body worn cameras, onboard RGB-D cameras on AR hardware, IoT, or other data collected by the system historically or in real-time. New or updated concepts and features identified by the system can be checked against a human-in-the-loop before being integrated into the system. Some implementations of the digital twin 120 may be linked to adaptive learning and simulation environment control algorithms that are able to manipulate the parameters of the simulation and track and store those manipulations over time.

The simulation of the system and its sub-components may be optimized and scaled to the needs of the user through a process of encapsulation and abstracted interfaces, similar in nature to the use of renormalization in quantum physics and computation techniques used in lambda calculus, for reconciling relationships between computational parameters at different levels of scope within the simulation. Accordingly, it may be possible to abstract the functioning of many sub components within a system to their overall role within the system with or without the simulation of the individual sub-components, by referencing the results of previous simulations under the same circumstances, extrapolating from previous results and applying to new circumstances or by giving probabilistic results based on accumulated results from many previous simulations. There is an inherent tradeoff between the fidelity of the results and the speed of the results that is tunable in this type of system. It also enables large system simulations to take advantage of previous subsystem simulations that have been run or data that has been collected about their operations.

Figure 3:
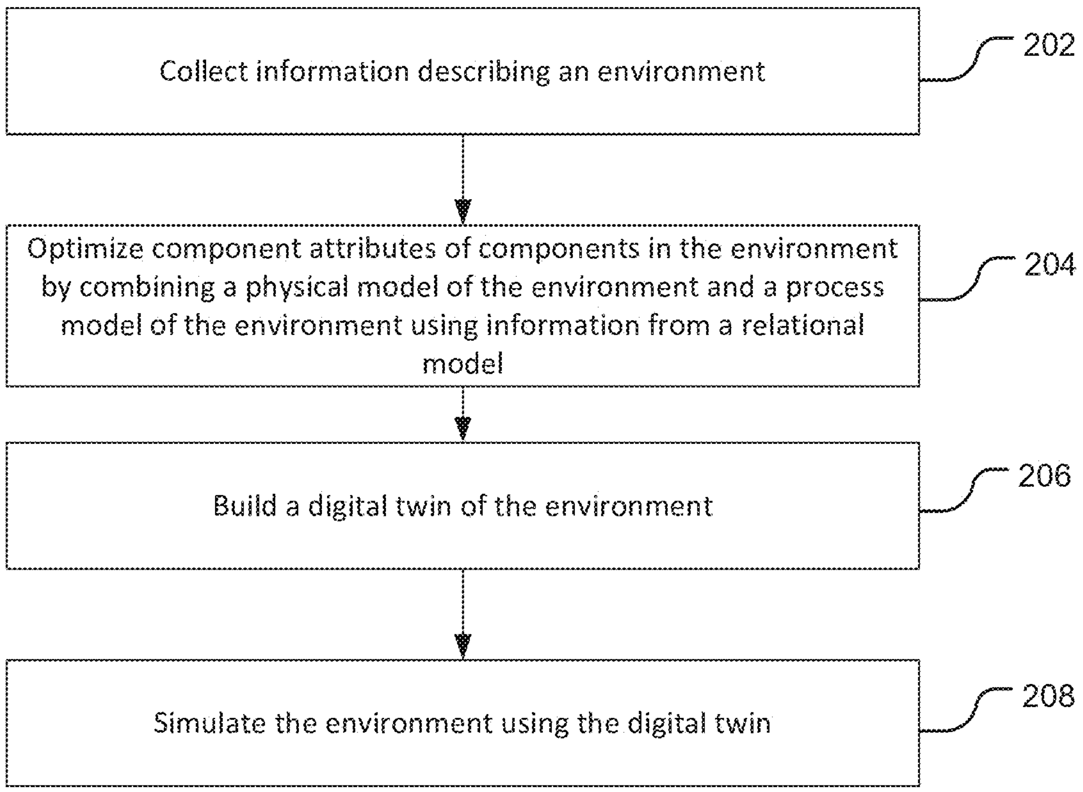
FIG. 3 is a flow diagram of steps for generating and using a digital twin of a physical environment.

FIG. 3 is a flow diagram of steps for generating and using the digital twin 120 of a physical environment. First, an information collection operation 202 collects information describing the environment. The information collection operation 202 may include generation of the physical model 108, the process model 110, and the relational model 112. During the information collection operation 202, a diagram or plan of the environment, such as the P&ID 104, is used to generate the process model 110. The P&ID 104 may be scanned into the system and digitized or an existing digital file of the P&ID 104, such as a raster or vector image of the P&ID or a file representing the P&ID's data directly, may be used. For example, in one implementation, computer vision, including optical character recognition, is used to extract symbols and annotations from the P&ID 104. Symbols representing a component or junction in the P&ID 104 are translated to a vertex in the process model 110, while connections between components (e.g., pipes) are stored as edges in the process model 110. Annotations or additional information regarding components or pipes in the P&ID 104 may be stored at the vertices or edges of the process model 110, respectively. Direction of flow, pipe class, sizing, and pressure rating may all be indexed as edge or vertex attributes in the process model 110. For example, the process model 110 shown in FIG. 2 includes vertices 126 and 128 for gate valves, identified as "GV-122" and "GV-132" respectively. The vertices 126 and 128 are connected by edge 130, which stores an edge attribute "class A."

The information collection operation 202 may also include acquisition of the RGB-D data 102, or other sensor data, and the generation of the physical model 108 from the RGB-D data 102, or other sensor data. For example, the RGB-D data 102 may be acquired using photo aligned light detection and ranging (LiDAR). In some implementations, the photo aligned LiDAR may have a relatively low resolution, but may capture or provide sufficient information to infer details of the environment while saving computational resources, time, and/or money when compared to a higher resolution system. In other implementations, high resolution LiDAR may be used to capture additional detail. In various implementations, the photo aligned LiDAR system may be carried or moved by a human operator, mounted to a vehicle or robot, or a combination of these methods. In some implementations, sensors may collect other types of data from the physical environment. For example, RF beacons, visual markers, QR codes, or other indicators may be placed at known locations in the physical environment to assist in aligning RGB-D data 102 and construction of the digital twin 120. In some implementations, the RGB-D data 102 and/or other sensor data may be captured using one or more other methods such as infrared (IR) scanning, stereoscopic cameras, or sonar, in addition to or instead of LiDAR.

During the information collection operation 202, the RGB-D data 102 is used to generate the physical model 108. Generally, the RGB-D data 102 is analyzed to look for components based on, for example, known relative size and shape of various components. The RGB-D data may be treated as a single source of information or may be separated into multi-modal discrete channels used for cross-modal validation. In one implementation, RGB image data may be provided to a convolutional neural network, or other machine trained algorithm, to detect components and localize detected components in two dimensional space. The convolutional neural network may use various algorithms, such as simultaneous location and mapping (SLAM) to construct a 3D model of the environment and localize the components in three dimensional space. Point cloud data may be provided to another deep network, such as PointPoseNet, or to an analytical algorithm, such as detecting intrinsic shape signatures (ISS), or iterative closest point registration (ICP) to confirm the identity of objects identified in RGB images and to estimate pose of detected objects. In some implementations, various computer vision algorithms may be used to identify objects in RGB images.

In other implementations, the combined RGB-D data, processed or raw, with or without additional sensor data types included, may be used to train machine learning algorithms to perform similar functions as those described above in association with the information collection operation 202. Additionally, in some implementations, a human-in-the-loop may be used to identify objects or verify the identity of objects generated by the system. For example, the system may present image data to a human, representing either part of or all of one or more photographs, depth images, rendered images of the collected spatial data, or other graphics representing real or abstract data. For example, this may be presented via a display associated with a user device accessible or viewable by the human user when the system is unable to identify a component based on RGB data. In this manner, the human user may provide input to the user device to assist the system in making decisions about a particular component element. For example, the system may, in some implementations, present image data, an initial identification, a reference related to the potential identification and/or other relevant information to a human for verification input by the human user. Such verification and identification by a human may increase accuracy of the physical model 108 and be useful to train various computational models used during the information collection operation 202.

Accordingly, the physical model 108 may store components and connecting components (e.g., pipes) as vertices, where the edges between vertices reflect a physical connection between components with information relating to the physical connection, or functional relationships between components. Additionally, in some implementations, additional feature detection algorithms may be used to estimate properties of components or component connectors. For example, an algorithm may be used to estimate cylindrical curvature of a pipe and its axis of flow, or the current setting of a manually driven handle. Those estimations may then be stored as attributes of the vertex of the physical model 108 representing the component or pipe.

In some implementations, the information collection operation 202 may also include generation or updating of the relational model 112. For example, domain knowledge specific to a particular physical environment, company, industry, or type of environment may be added into a generic relational model 112 or may be used to generate a relational model 112 specific to the environment. Similarly, one or more relational models 112 may be chosen from multiple relational models based on characteristics of the environment. For example, where the environment being mapped is a chemical manufacturing plant, a relational model 112 specific to chemical manufacturing plants may be selected and used to generate the digital twin 120. The relational model 112 may also be specific to more specialized environments. For example, a relational model 112 may be developed for low-density polyethylene manufacturing, as opposed to chemical manufacturing at large. In this manner, the efficiency and/or accuracy of the correlation process and the like may be improved as many features specific to the type of environment may be accounted for in the specialized relational model, and information found in the relational model may limit the search space of possible matchings or give indications as to which potential matchings should be explored first. Further, during the mapping of a specific environment, patterns may become apparent in the early stage of mapping that can enhance the speed and accuracy of later stages of mapping such as patterns in the specific component types used, their coloring, the environmental lighting at the time of capture, and organic elements such as wear patterns.

Figure 4:
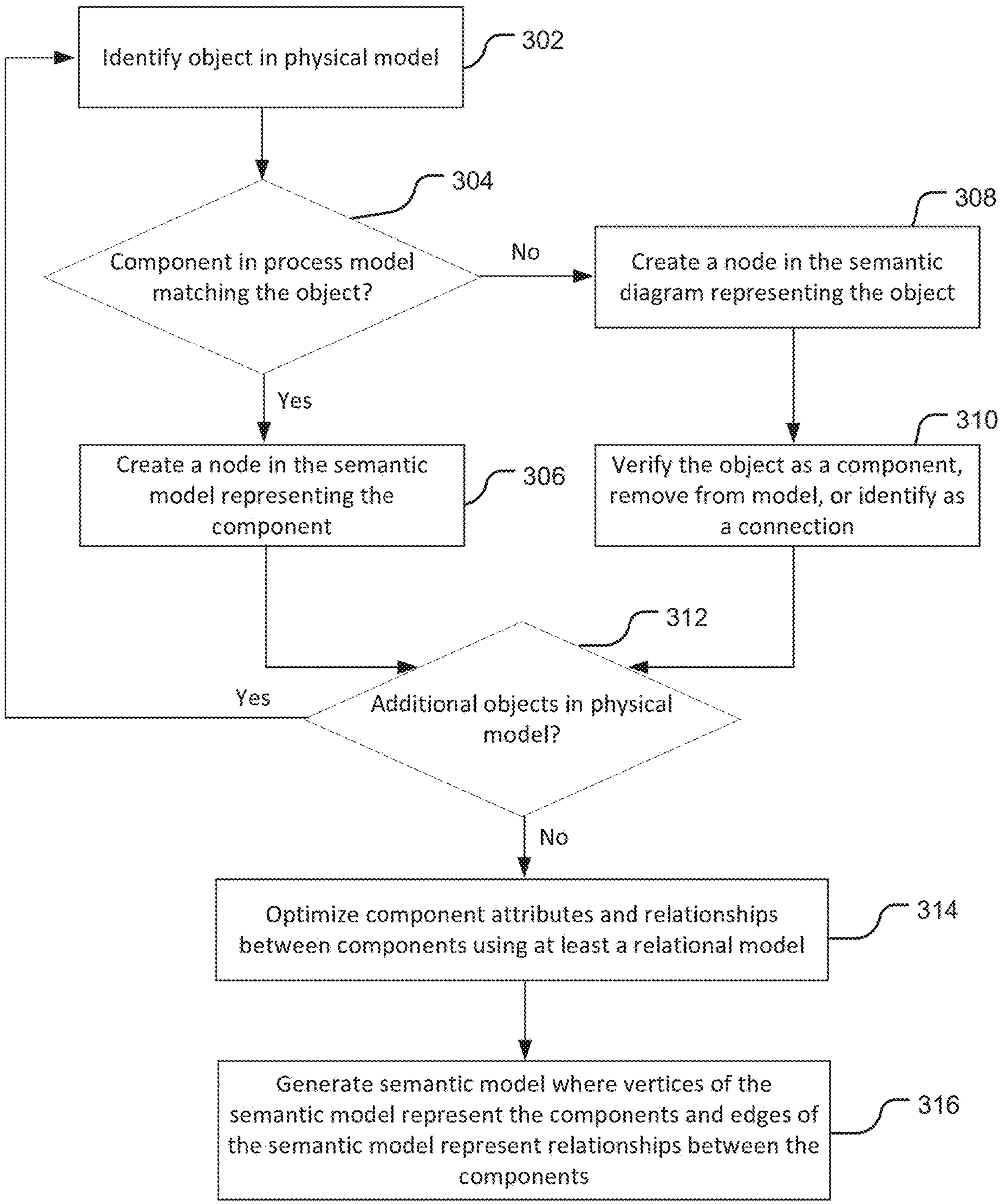
FIG. 4 is a flow diagram of steps for generating a semantic model of a physical environment for use in generating a digital twin of the physical environment.

An optimizing operation 204 optimizes accuracy of component attributes of components in the environment by combining the physical model 108 of the environment and the process model 110 of the environment using information from the relational model 112. The optimizing operation 204 may generate and optimize the semantic model 118. For example, the flow diagram of FIG. 4 shows steps for generating the semantic model 118 and each of the steps described with respect to FIG. 4 may occur during the optimizing operation 204. In some implementations, generation of the semantic model 118 may include storage of parameters for individual components and connecting components. For example, parameters describing components such as dimensions, color, and particular feature sets may be measured from the RGB-D data 102 and included in the physical model 108. During graph matching (or other methods of combining the models), the parameters may then be stored in the semantic model 118 as vertex or edge attributes, as appropriate.

Generally, the optimizing operation 204 may include graph matching between the physical model 108 and the process model 110. During the graph matching, the process model 110 may be used as ground truth where the vertices and edges of the process model 110 are used as a checklist for or to otherwise verify initial graph matching steps. In some implementations, where a part of the physical model 108 does not match up to either a vertex or an edge in the process model 110, an additional vertex is created in the semantic model 118. In some implementations, these vertices may be transmitted to a human-in-the-loop for verification. For example, the image of the object may be sent to a computing device where a user may match the object to a component of the process model 110, provide additional information about the object, or request that the vertex be removed from the semantic model 118. For example, where a hard hat is left in the environment during a scan, the hard hat may be included as a vertex of the physical model 108 but will not be represented in the process model 110 and may not be included in the semantic model 118 after a verification. Infrastructure parts like support beams and stairs may also not be featured in a process model, but may be relevant to the creation of a digital twin, and may therefore be included in the semantic model but without an association to a vertex in the process model. Continuing with the first example, when the vertex of the physical model 108 is not able to match to a vertex in the process model 110, an image of the hard hat may be transmitted to a user, who may request that the hard hat be removed from the final model. In other examples, the image detection or the like may be used to analyze the image (rather than a user) to identify that the component is a hat or other non-equipment related component. In some implementations, feedback from the human-in-the-loop may be used by the model to learn such that the input is requested less over time. In some implementations, it may not be necessary to generate a graph for the physical model as a discrete step. Instead, the semantic model may be produced by traversing the process model concurrently with RGB-D data, normalized point clouds, other input data, and the relational model, and fully and probabilistically determining the most likely identity and pose of a component before moving on to the next component. This process may similarly make use of procedural algorithms, machine trained algorithms, or a human-in-the-loop.

The optimizing operation 204 also includes optimization of connections and relationships between components, as well as optimizing the poses (e.g., position, orientation, and possibly additional parameters) of components based on connections between the components and probabilities from the relational model 112. For example, an estimated pose for each component may be obtained from the physical model 108, as measured during the information collection operation 202. The pose estimations may be adjusted for individual components based on the connection between the components and other components. For example, where two valves are connected by a pipe, the poses of each valve may be adjusted to reflect the high probability that the pipe runs in a straight line between the valves, either parallel or perpendicular to the ground. In some implementations, the optimizing operation 204 may also include application of ground truth anchors or other constraints to the semantic model 118. The optimized semantic model 118 may then be used to generate the digital twin 120 of the environment.

A building operation 206 builds the digital twin 120 of the environment. The digital twin 120 is constructed using information contained in the semantic model 118 and information from a model library, such as the CAD library 122. In some implementations, the building operation 206 may occur in a 3D modeling application, such as Blender, using scripts that cooperate with the application programming interface (API) of the 3D modeling application. Scripts may access the relevant information required for the construction of the digital twin (such as that in the semantic model 118) by accessing the data storage structure, which may be located on the same machine or may be accessed through a network. For example, the scripts may proceed through vertices of the semantic model 118 and, at each vertex, select a model from the model library to use in the digital twin. Where the model library includes parametric models, the script may apply vertex attributes as parameters to the parametric model to generate a model matching the data. For example, color, size, or exterior patterns may be stored as vertex attributes and applied to the parametric model to generate a CAD model of the correct color, size, or exterior pattern. In some implementations, the component may be grouped into subcomponents to facilitate accurate movement of the component responsive to interaction with the component. For example, a component may include a valve hand-wheel and a stem as subcomponents such that the valve hand-wheel can be turned and the stem moves in response. In some implementations the building operation for the digital twin 120 may occur within a game engine, such as UNITY, or within a custom spatial computing engine. In some implementations, the entire model may not be built at one time and, instead, individual parts of the model may be rendered at run time by directly accessing the semantic model and looking up relevant models from the model library.

In some implementations, models within the CAD library 122 may be defined mathematically using shapes such as vectors and curves, and procedural modifiers such that, after the correct parameters are applied, the defined 3D shape can be replaced with a polygonal mesh at the appropriate scale which can then be added to the digital twin to allow interaction with the other components. In some implementations, this or other forms of scaling and meshing allow for control of rendering quality based on intended use. For example, photo realistic digital twins can be generated for use in AR/VR systems that have processing resources to render the full quality, while reduced rendering quality may be suitable for viewing with a lower processing power device, such as a mobile device. Similarly, textures and/or materials for the components and environment of the digital twin may be stored and rendered as rasterized or mathematically defined and scalable assets for which the quality can be tuned prior to use, or in real-time, to optimize the performance of the application for a particular device, network connection, and/or end-user need.

As models of components are generated, the models are placed within the digital twin according to pose data contained in the semantic model 118. The final digital twin 120 may be checked against the original data (e.g., RGB-D data 102 and the P&ID 104) for model fit. In some implementations, a human-in-the-loop may review aberrant features of the digital twin 120 identified during the checking process.

A simulating operation 208 simulates the environment using the digital twin 120. The digital twin 120 may be imported into a gaming engine, such as UNITY®, and may then be exported to an AR/VR or other platform as an application. Within the gaming engine, scripts may traverse the digital twin 120 component hierarchy and apply appropriate classes based on component IDs or naming conventions. In some implementations, additional files (e.g., a sidecar file) may be transmitted to the gaming engine with the digital twin 120 and may contain metadata to assist in class application. However, it should be noted that the type of data transmission and input to the simulation engine may vary as needed, depending on the type of simulation engine, the data formatting needed, and the like. The classes may provide interaction as well as handles for the simulation environment and may also allow customization of a simulation for specific needs. For example, before exporting the digital twin 120 as a simulation, explanatory text, questions, tasks, prompts, or other interactive features may be added to the simulation. For example, where a simulation is used for training purposes, components may be coupled with questions that the trainee must answer while moving through the simulation. Further, these questions and user interactions may be connected to an adaptive learning system that is able to manipulate the environment, including the digital twin and the individual components and their properties. For example, a component that was previously working properly in the simulation could be 'damaged' to produce a leak that would result in a change in the functioning of the system and the environment to alter the learning experience for the user. Such changes may occur, for example, if new information is obtained about the real system, if a user wants to simulate new possibilities or scenarios, or if the real system is altered and the simulation needs to be altered to reflect the alteration.

FIG. 4 is a flow diagram of steps for generating the semantic model 118 of a physical environment for use in generating a digital twin of the physical environment. The steps shown in FIG. 4 may, in some implementations, occur as part of the optimizing operation 204 described in FIG. 3. Generation of the semantic model 118 generally uses information represented in the physical model 108, the process model 110, and the relational model 112. The process model 110 may be used as a ground truth, where vertices of the physical model 108 are matched to the process model 110 to begin generation of the semantic model. This matching of vertices may occur on a global graph matching basis, or while traversing the graph component-by-component moving primarily linearly through the system. In some circumstances, particularly when modeling natural systems, there may be no process model available, and creation of the semantic model may rely on the information from the physical model, the relational model, and any potential humans-in-the-loop.

An identifying operation 302 identifies an object in the physical model 108. A decision 304 determines whether a component in the process model 110 matches the object. To determine whether a vertex of the physical model 108, or subset of data from the scan, matches a vertex in the process model 110, a vertex in the physical model 108 is matched with vertices containing the same component type in the process model 110. Adjacency matrices of the vertex of the physical model 108 and vertices of the process model 110 may be compared to analyze component patterns to determine which vertex in the process model 110 matches the vertex in the physical model 108. For connecting components (e.g., pipes), the vertex of the physical model 108 representing the pipe may be compared to edges of the process model 110.

Where a component in the process model 110 does not match the object, a creating operation 308 creates a vertex in the semantic model 118 representing the object. Such components may be labeled by a special classification tag. A verifying operation 310 then verifies the object as a component, removes the vertex from the model, or identifies the object as a connection. In various implementations, the verifying operation 310 is implemented using a specialized algorithm or model, a human-in-the-loop, or a combination of a model and a human-in-the-loop.

For example, some vertices in the physical model 108 may not be linked to a component type known by the model. Those vertices may represent temporary objects present in the environment during mapping that are not intended to be included in the semantic model 118. For example vertex 154 in the physical model 108 is unidentified and does not match a component in the process model 110. In some implementations, a model or algorithm may determine that the object represented by the vertex 154 should not be included in the semantic model 118. In some implementations, a human-in-the-loop may verify the decision of the model or independently review the vertex 154 and determine that the object should not be included in the semantic model 118. In other situations, objects in the physical model 108 but not in the process model 110 should be included in the semantic model. For example, vertex 156 in the physical model 108 represents a ground, which is not shown in the process model 110. However, a vertex 158 in the semantic model 118 is generated to represent the ground in the semantic model 118.

Returning to the decision 304, where a component in the process model 110 does match the identified object, a creating operation 306 creates a vertex in the semantic model 118. For a component, the vertex attributes of the vertex in the process model 110 and the vertex of the physical model 108 may be combined and stored as vertex attributes of the vertex in the semantic model 118. Where the identified object is a pipe segment, the identification creates a new vertex in the semantic model 118 bisecting an edge in the process model 110 connecting two components. The edge may be further bisected by additional pipe segments. Vertex attributes of the pipe segment vertex may include edge attributes from the process model 110 and vertex attributes from the physical model 108.

For example, the process model 110 includes vertices 126 and 128 representing gate valves connected by an edge 130 with an edge attribute "class A." Matching gate valve vertices 132 and 134 in the physical model 108 are separated by vertices 136, 138, and 140 representing pipe segments. During graph matching, the vertex 132 in the physical model 108 is matched to the vertex 126 in the process model 110 and represented as vertex 142 in the semantic model 118. Similarly, the vertex 134 in the physical model 108 is matched to the vertex 128 in the process model 110 and represented as vertex 144 in the semantic model 118. The vertices 136, 138, and 140 representing pipe segments connecting the gate valves in the physical model are then incorporated into the semantic model 118. A vertex 146 is created corresponding to the vertex 140 in the physical model 108, and bisects the edge between the vertices 142 and 144. Because the edge 130 of the process model 110 has an edge attribute of "class A" (indicating class A pipe), the vertex 146 in the semantic model 118 retains "class A" as a vertex attribute. A vertex 148 corresponding to the vertex 136 in the physical model 108 then bisects the edge between the vertices 142 and 146 in the semantic model 118 while retaining the "class A" vertex attribute. A vertex 150 similarly bisects the edge between the vertices 146 and 144 in the semantic model 118.

A decision 312 determines whether there are additional objects in the physical model. Where there are additional objects, the process returns to the identifying operation 302 for the next object in the physical model. Where there are no additional objects (e.g., all have been identified and vertices incorporated into the semantic model), an optimizing operation 314 determines component attributes and optimizes relationships between components using at least a relational model. Component attributes may include estimated pose information for each component, which may be adjusted during the optimizing operation 314.

The optimizing operation 314 includes optimizing relationships between components, which may include optimizing the poses of various components along a connecting pipe. For example, a semantic model 118 may include three valves represented by vertices 142, 144, and 152, where each pair is connected by a pipe. The physical model 108 includes a pose estimation for each of the three valves, shown roughly by the angle of edges between the vertices. During graph matching to generate the semantic model, the types of valves, as well as the connections between the valves are constrained by the process model 110. To optimize the poses of the valves, information from the relational model 112 is used to constrain the pipes connecting the valves. For example, the relational model 112 shows a high probability that pipes connecting the valves will be either horizontal or vertical and will run in a straight line. The poses of the valves and pipes may then be adjusted to maximize the probability distribution given the probabilities and constraints in the process model 110 and the physical model 108. For example, the poses of the vertices 144, 142, and 146 are adjusted in the semantic model 118 such that pipe segments between the valves run either vertical or horizontal and match up to, for example, connections in the T-pipe represented by the vertex 146. This process is repeated for the components and connecting components in the semantic model 118.

In some implementations, the optimizing operation 314 may include optimization of the semantic model 118 given additional ground truth constraints. For example, ground truth anchors may be used to provide rigid points of correspondence about which the semantic model can be adjusted and conformed. Ground truth anchors may be applied or collected during an initial scan of the environment via QR codes, RFID tags, manual tagging of data, visual anchors, or other methods. In some implementations, new ground truth anchors may be introduced during the optimizing operation 314 by a human in the loop.

A generating operation 316 generates a semantic model where vertices of the semantic model represent the components and edges of the semantic model represent relationships between the components. The generating operation 316 may include cross-checking the optimized semantic model 118 against the process model 110, ground truth constraints, or additional constraints to ensure that the semantic model 118 is fully optimized. In some implementations, the generating operation 316 may include a human-in-the-loop to address specific conflicts between the semantic model 118 and given constraints or as a final check of the semantic model 118.

Figure 5:
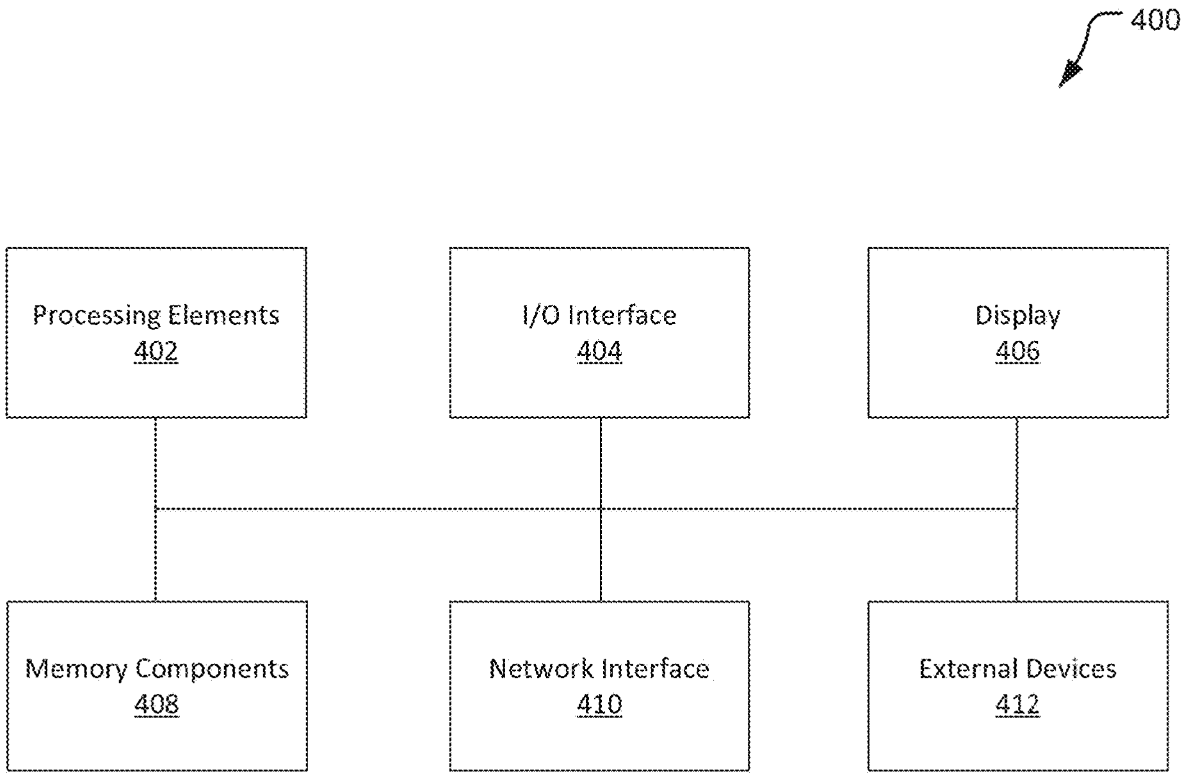
FIG. 5 is a schematic diagram of an example computer system implementing various embodiments in the examples described herein.

FIG. 5 is a schematic diagram of an example computer system 400 for implementing various embodiments in the examples described herein. A computer system 400 may be used to implement the computing device 124, the physical model 108, the process model 110, the relational model 112, the semantic model 118, and the final digital twin (in FIG. 1B and corresponding representations in FIG. 7), as well as processes which analyze and/or construct the models. A computer system 400 may also be integrated into one or more components of various systems described herein. For example, a computing system 400 may be used to communicate with a human-in-the-loop to generate the semantic model 118. The computer system 400 is used to implement or execute one or more of the components or operations disclosed in FIGS. 1-4. In FIG. 5, the computer system 400 may include one or more processing elements 402, an input/output interface 404, a display 406, one or more memory components 408, a network interface 410, and one or more external devices 412. Each of the various components may be in communication with one another through one or more buses or communication networks, such as wired or wireless networks.

The processing element 402 may be any type of electronic device capable of processing, receiving, and/or transmitting instructions. For example, the processing element 402 may be a central processing unit, graphics processing unit, tensor processing unit, ASIC, microprocessor, processor, or microcontroller. Additionally, it should be noted that some components of the computer 400 may be controlled by a first processor and other components may be controlled by a second processor, where the first and second processors may or may not be in communication with each other. In some implementations, processing may be distributed (e.g., with cloud computing, processing may be distributed across multiple processing units on remote servers).

The memory components 408 are used by the computer 400 to store instructions for the processing element 402, as well as store data, such as the models described in FIG. 2 and the like. The memory components 408 may be, for example, magneto-optical storage, read-only memory, random access memory, non-tangible memory, erasable programmable memory, flash memory, or a combination of one or more types of memory components.

The display 406 provides visual feedback to a user. Optionally, the display 406 may act as an input element to enable a user to control, manipulate, and calibrate various components of the system as described in the present disclosure. The display 406 may be a liquid crystal display, plasma display, organic light-emitting diode display, and/or other suitable display. In embodiments where the display 406 is used as an input, the display may include one or more touch or input sensors, such as capacitive touch sensors, a resistive grid, or the like.

The I/O interface 404 allows a user to enter data into the computer 400, as well as provides an input/output for the computer 400 to communicate with other devices or services. The I/O interface 404 can include one or more input buttons, touch pads, controllers (e.g., 6 degree of freedom controllers), motion and/or gesture tracking, eye tracking, real-world object tracking, and so on.

The network interface 410 provides communication to and from the computer 400 to other devices. For example, the network interface 410 may allow for communication to a human-in-the-loop through a communication network. The network interface 410 includes one or more communication protocols, such as, but not limited to WiFi, Ethernet, Bluetooth, and so on. The network interface 410 may also include one or more hardwired components, such as a Universal Serial Bus (USB) cable, or the like. The configuration of the network interface 410 depends on the types of communication desired and may be modified to communicate via WiFi, Bluetooth, and so on.

The external devices 412 are one or more devices that can be used to provide various inputs to the computing device 400, e.g., mouse, microphone, keyboard, trackpad, or the like. The external devices 412 may be local or remote and may vary as desired. In some examples, the external devices 412 may also include one or more additional sensors. External devices may also be used for user authentication and may include biosensors such as finger print, retinal, or other scanners.

Figure 6:
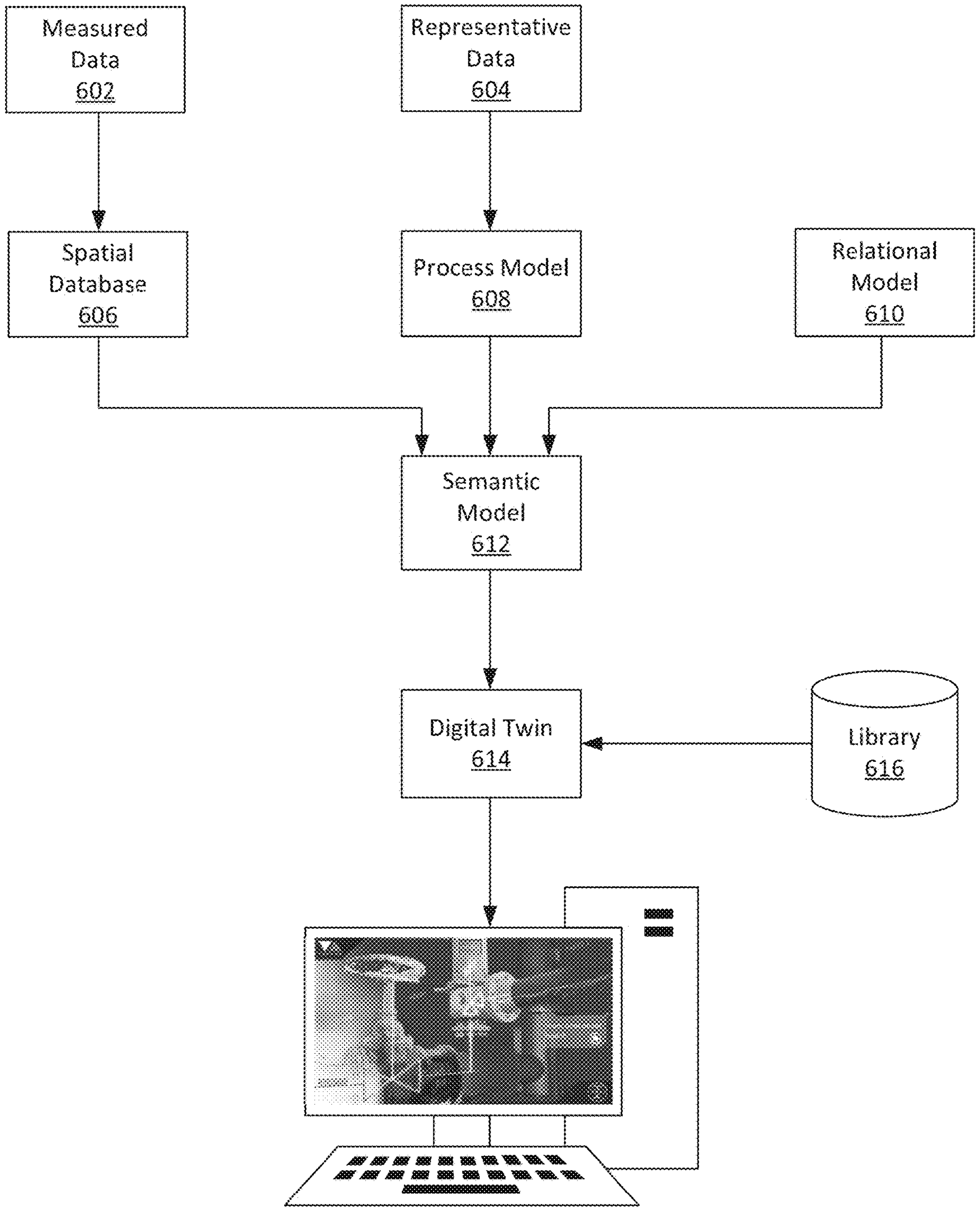
FIG. 6 illustrates an additional example diagram of a system for creating a digital twin of a physical environment.

FIG. 6 illustrates an additional example diagram of a system for creating a digital twin of a physical environment. The digital twin 614 generated using the system of FIG. 6 may, like the digital twin 120, provide a high-fidelity interactive simulation of a physical environment, allowing humans, machines, and/or digital systems to interact digitally with the physical environment. The digital twin 614 is generated using data about the physical environment. For example, measured data 602 may be utilized to create a spatial database 606 or other physical model and representative data 604 may be utilized to create a process model 608. The spatial database 606 and the process model 608 are then used to generate a semantic model 612 and a digital twin 614. In some examples, a relational model 610 may be used in conjunction with the spatial database 606 and process model 608 to generate the semantic model 612.

Measured data 602 may include various types of data obtained through measurements of the physical environment being modeled. For example, RGB-D data for the environment may be obtained using various combinations of LiDAR and one or more RGB cameras. Other types of measured data may include thermal values of the environment, surface reflectivity, environmental measurements (e.g., air moisture content, air flow), and the like. Such data may be obtained using various types of sensors, including, for example, infrared imaging, moisture sensors, and/or barometric pressure sensors. Some measurement devices may have additional sensors used to help determine the position and/or orientation of the measurement device in space, such as a GPS or accelerometer. The types of measured data 602 used to generate the spatial database 606 may vary depending on the type of environment being modeled with the digital twin 614. For example, altitude data and air speed data may be useful when modeling a natural environment (e.g., a forest) and surface thermal values may be useful when modeling, for example, an industrial environment.

The spatial database 606 may be an implementation of the physical model 108, organizing and representing the measured data 602 of the physical environment. The spatial database 606 may, in various examples, include the measured data 602 represented, for example, as a point cloud, graph, or other data structure. In some examples, the spatial database 606 may include temporal data such that the spatial database is a spatiotemporal database of the measured data 602. For example, temporal data may capture motion of components of the physical environment, changes in environmental measurements of the environment over time, and the like. Creating the spatial database 606 may involve filtering or adjusting the measured data based on various qualities, processing separate data points into aggregated information (for example, constructing a 3D normalized point cloud from many RGB-D images), or extrapolating additional data from the given information.

Representative data 604 may include various types of schematic and/or encoded data about the physical environment or processes being modeled. Maps of the physical environment, P&IDs, descriptions of the physical environment (e.g., a written description of a natural environment), surveys, architectural models, and schematics are some examples of representative data 604 that may be used in generating a digital twin 614 of the physical environment. For example, when creating a digital twin of a forest, representative data 604 may include trail maps of the area being modeled and written descriptions of one or more portions of the area being modeled. When creating a digital twin of an industrial environment, a P&ID may be provided as representative data 604. Sources of representative data 604 may include information about, or accurately reflect, the relative size and position of the included components (e.g. a street map), or the sources may be more abstract, only showing the relationships between components without regard to where the components are in the real world or where they are shown on the diagram (e.g. a circuit diagram).

The process model 608 may be similar to the process model 110, and may vary in form based on the type of environment being modeled, types of representative data 604 used to generate the process model 608, or other factors. For example, the process model may be a graph including nodes (e.g., vertices) and edges representing different components of the physical environment being modeled. The data encoded by the nodes and edges may vary based on the physical environment being modeled. For example, in a process model 608 of an industrial environment, the nodes or vertices may represent discrete components in a P&ID or junctions where three or more pipes intersect, while edges may represent pipes or other types of connectors used in the industrial environment. In a process model 608 of a natural environment, the nodes may represent vegetation, while the edges may represent or hold data about orientations between the types of vegetation, environmental data, and the like. In some cases, a graph structure with vertices and edges may not be required, and the data may be stored in ordered or unordered lists or tables.

The relational model 610 may be implemented using the relational model 112 and/or other types of relational models, depending on the physical environment being modeled. In some examples, the relational model 610 may be generated based on domain knowledge about the physical environment. In some examples, existing relational models 610 may be used and/or may be updated with further domain knowledge specific to or applicable to the physical environment being modeled. For example, for an industrial environment, the relational model 610 may specify physical constraints on components and relationships between components, encoding likelihoods of various placements of components, angles of pipe travel, and the like. When modeling a physical environment including one or more natural components (e.g., plants) the relational model 610 may include, for example, probabilities of specific growth patterns, relationships between natural and manmade features, and the like. For example, a relational model 610 used to create a digital twin of a city block or similar environment including human-made and natural elements may encode information about expected locations of vegetation (e.g., grass, trees, bushes, etc.) relative to asphalt, concrete, or other human-made surfaces. Such information or constraints may be represented as probability distributions, constraints, and/or guidelines, and may be encoded as lists of values representing probabilities or likely parameters, a set of mathematical functions, as a set of past common examples, or with other forms of data, either machine learned or procedurally created.

In some examples, the relational model 610 may also contain a component model library either in full or through unique pattern reference. For example, a 3D model of a gate valve may be stored as a probabilistic likelihood that a particular distribution of points in space reflect the existence of that gate valve in that location in a particular orientation and scale, or an algorithm that compares a given subset of a point cloud to a stored 3D mesh to determine the likelihood that the point cloud contains the object represented by the mesh, and uses registration to determine the most likely position, orientation, and scale of the object within the point cloud. Similarly, a recognizable pattern of color and edges may be representative of a particular type of fern, tree, or the like in a natural environment, such as a forest.

The spatial database 606, process model 608, and relational model 610 may be combined and/or utilized to generate the semantic model 612. The semantic model 612 includes information about the physical environment sufficient for automated creation of a digital twin 614. The semantic model 612 generally includes all components or objects in the system as well as relationships between the objects. The information included in the semantic model 612 may vary based on the type of physical environment being modeled, intended uses and/or functionality of the digital twin 614, and other factors. For example, a semantic model 612 of an industrial environment may be a graph database where the vertices represent components of the system being modeled, including connecting infrastructure, while edges could describe the plane of separation between two connected components, e.g., the surface plane at which two flanges meet, a functional relationship between two components, like a handle that affects the pressure in a separate valve, or a relationship between the properties of two vertices, such as two components made of similar or identical materials. For a semantic model 612 used to generate a functional digital twin useful for training purposes, the edges may further store information about functional relationships between connected components (e.g., how components move physically with respect to each other). The semantic model 612 may contain full, partial, or no information about functionality of components. In various examples, the semantic model 612 may have the capability (e.g., through semantic component awareness) to reference functionality information and build a more robust model over time.

The digital twin 614 may be generated using the semantic model 612 and a library 616. The library 616 may be, like the CAD library 122, a parametric CAD library in which components (e.g., industrial components) and their variations are constructed from mathematical representations of their geometry based on simple paths and shapes augmented through a series of parametric procedural modifiers. In natural or organic systems, the library 616 may include models constructed from mathematical patterns that produce similar and relevant but non-standardized results for more natural environment representations. Such models may match detail data from the specific environment being simulated or a more general description of a component (e.g., a plant) and a type of component in the world. Fractal properties of plants and other natural systems may be represented, in some examples, through visual textures or rendering algorithms instead of being represented through 3D models. Such visual textures or rendering algorithms may, in a virtual twin, appear to have the 3D fractal properties of the plant or other natural system they represent.

The digital twin 614 may be implemented using any of the described methods and/or modules described with respect to the digital twin 120. The digital twin 614 may further, when completed, be directly linked to adaptive learning and simulation environment control algorithms to manipulate parameters of a simulation using the digital twin 612 and track and store such manipulations over time.

Figure 7:
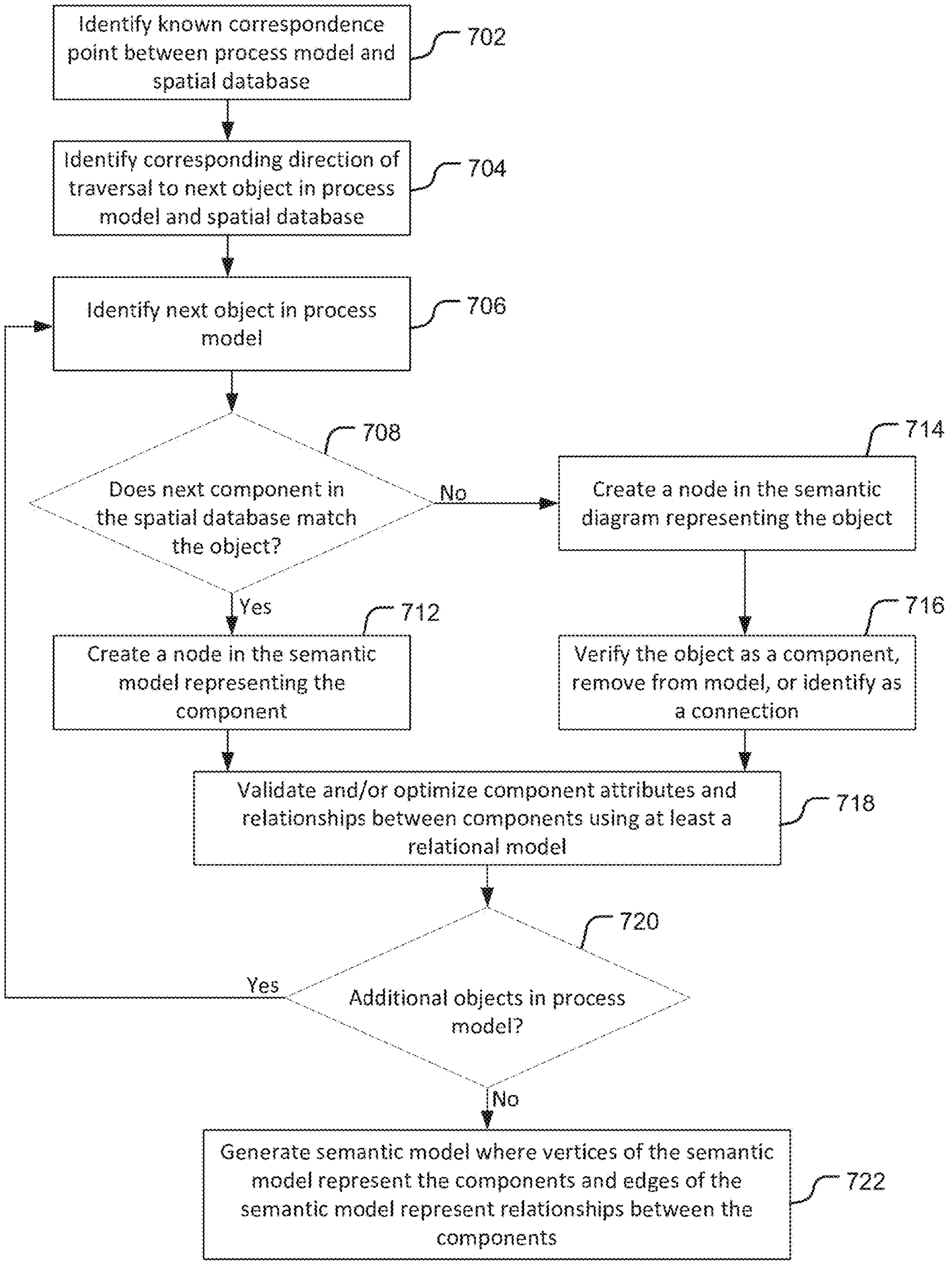
FIG. 7 is a flow diagram of example steps for generating a semantic model of a physical environment for use in generating a digital twin of the physical environment.

FIG. 7 is a flow diagram of example steps for generating a semantic model of a physical environment for use in generating a digital twin of the physical environment. At block 702, a known correspondence point between the process model 608 and the spatial database 606 is identified. The known correspondence point may, for example, reflect that a set of spatial data in the spatial database 606 corresponds to a particular component of the process model 608.

At block 704, a corresponding direction of traversal to the next object is identified in both the process model 608 and the spatial database 606. Identification of a corresponding direction of traversal may include identifying a corresponding vector for traversal through the spatial database 606 and the process model 608. The angle of the vector may then reflect the corresponding direction of travel or traversal such that the next object in the process model 608 is likely reflected by a set of spatial data in the spatial database 606 close to the known correspondence point when traversing the spatial database 606 in the corresponding direction of travel.

A next object in the process model 608 is identified at block 706. The next object in the process model 608 may be identified by moving in the corresponding direction of traversal along an edge of the process model 608. Where, for example, the edge represents a connecting pipe, a spatial search algorithm may search the spatial database 606 to confirm and/or locate spatial data corresponding to the connecting pipe represented by the edge.

At block 708, a determination is made whether the next component in the spatial database 606 matches the next object in the process model 608. For example, the spatial search algorithm may analyze data from the next component in the spatial database 606 to confirm that the data roughly match what is expected based on the next identified component in the process model. For example, where the next object in the process model 608 is a pipe having a particular diameter, the spatial search algorithm may attempt to verify that corresponding spatial data in the spatial database 606 matches a pipe of the expected diameter. For example, the algorithm may look for flanges identifying separate sections of pipe or bends identifying a change in pipe direction. When one of the above conditions (or a similar condition for other components) occurs, data points from that spatial database 606 are compared to the next object of the process model 608.

When the next component in the spatial database 606 does match the next object in the process model 608, a node is created in the semantic model 612 representing the component at block 712. The next component in the spatial database 606 may be deemed a "match" to the next object in the process model 608 when the spatial data matches expected spatial data within some provided margin of error. In some examples, different error margins may be used. For example, a natural system may tolerate or use larger differences between an expected object and spatial data due to dynamic organic systems and non-standard objects. Smaller margins of error may be utilized for more precise systems (e.g., those constructed from standardized components).

When the next component in the spatial database 606 does not match the next object in the process model 608, a node is created in the semantic model 612 representing the object at block 714. At block 716, the object is verified as a component, removed from the semantic model 612, or is identified as a connection. A number of machine trained, procedural, or human-in-the-loop functions may be performed at this point to identify the component as well as its scale and orientation. This may occur in real-time during the computational analysis or asynchronously, allowing computation to continue without the confirmed identity of the component. This would additionally allow the component to be successfully identified later in the traversal of the process model 608, if it corresponds to a later part. For example, various machine trained algorithms may attempt to classify an object as part of the system using, for example, a trained classifier to determine whether the object belongs to any classes of objects which may be expected to be in the system. In some examples, where a machine trained model or algorithm cannot successfully classify the object within a specified degree of certainty, the object (e.g., a model of the object constructed from the spatial data) may be provided to a human for classification.

At block 718, the relational model 610 is used to validate and/or optimize component attributes and relationships between components in the semantic model 612. For example, the identified component and the previous component may be checked against the relational database and other information known about the system to identify any errors and reduce error propagation. The relational model 610 may also be used at this point to further constrain the search space and/or to support determinations of the probability of a specific component identification or its attributes.

At block 720, a determination is made whether there are additional objects in the process model 608. Where there are additional objects, the process returns to block 706 and the next object in the process model 608 is identified. Where there are no additional objects in the process model 608, the semantic model is generated at block 722. In circumstances where the system branches from a node in the process model to multiple edges, the process may proceed in parallel, alternating series, or a single path may be completed and then others followed up on in turn. Overlapping paths are accounted for in a tracking system that identifies if nodes and edges have been previously traversed or added to the list for traversal. In some examples, spatial information in the physical data that is not accounted for in correspondence with the process model may be dealt with immediately, flagged for later review, or assessed at the end of the process by assessing only points not accounted for in the physical model that has now been created.

Figure 8:
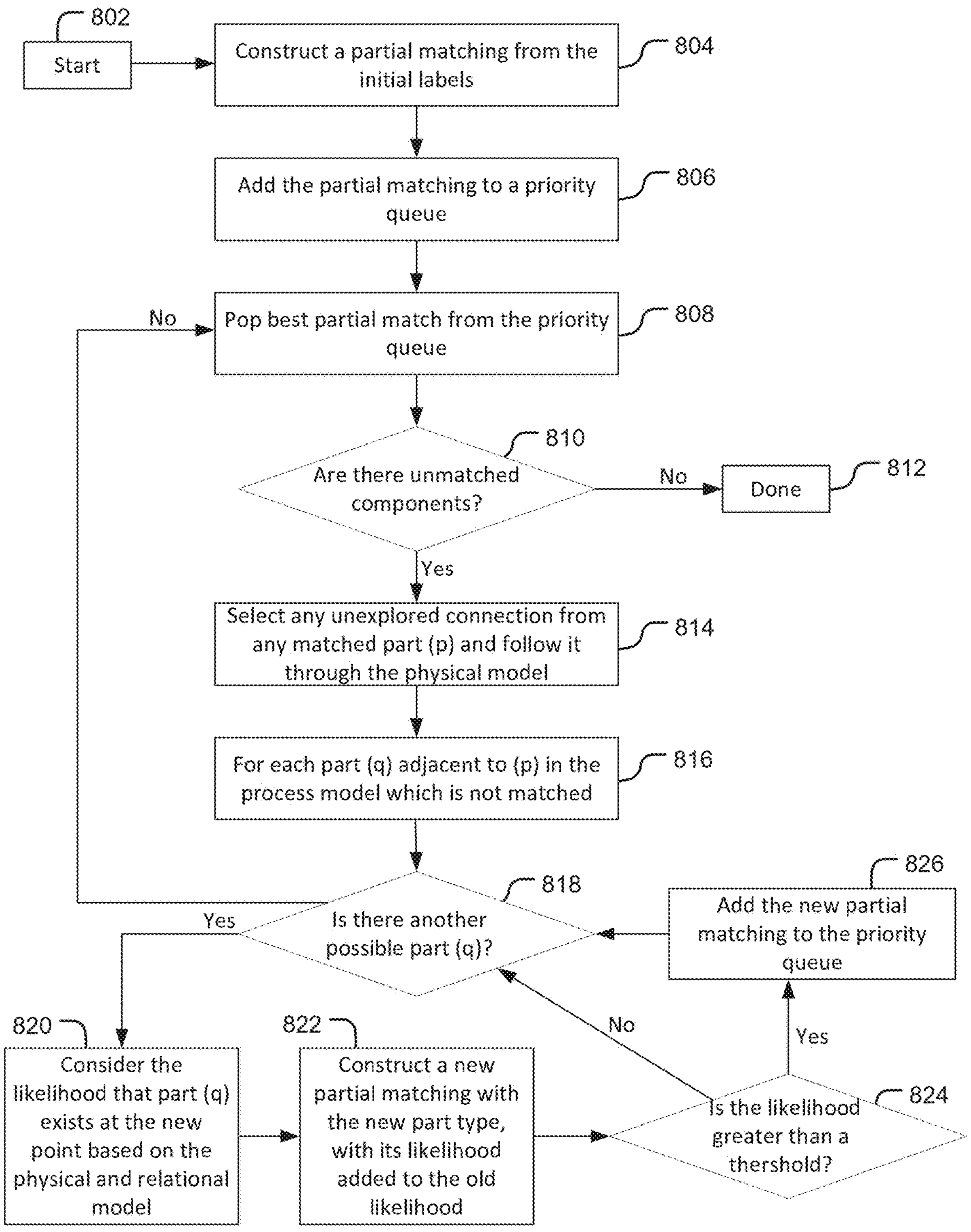
FIG. 8 illustrates an example flow chart of operations to create a semantic model from a physical model, process model, and relational model.

FIG. 8 illustrates an example flow chart of operations to create a semantic model 612 from the spatial database 606, process model 608, and relational model 610. In the method illustrated in FIG. 8, the algorithm associates the components of the process model 608 with part of the spatial model 606 in a manner complying with constraints and knowledge of the relational model 610.

In various examples, an algorithm (e.g., the algorithm used in the process depicted in FIG. 8) may search different possible ways the components identified in the process model 608 may be arranged, positioned, oriented, and connected in 3D space. The algorithm may evaluate how accurately those arrangements fit the measured data 602 and the physical model (e.g., the spatial database 606) and may evaluate how reasonable an arrangement is based on constraints and knowledge in the relational model 610. After computing some heuristic, one arrangement (e.g., the most likely or optimal arrangement) may be selected. In some implementations, smaller sections of the process model 608 (including, in some examples, individual components) may be searched for within the physical model. In such implementations, an arrangement for the smaller section of the process model 608 may be identified independently of the rest of the model. In some examples, analytical mathematical functions may be created which return a value for some parameter for some component without testing multiple values for the parameter. Functions for evaluating arrangements or computing optimal or other values may be procedural or machine trained. In some implementations, additional results from an evaluation of one possible arrangement may be utilized to determine which possible arrangements should be searched next.

In some examples, an algorithm for creating the semantic model 612 may be adapted from a path search algorithm, such as an A* search. In such examples, each edge in the searched graph represents placement of a single component in a single pose, and connects a vertex representing some subset of components to a vertex representing that subset of components plus the component assigned by the edge. Accordingly, a path from a vertex representing the empty set to a vertex representing the full set of components in the process model represents a full arrangement of components in the process model 608. Each edge in the search graph may be weighted by how likely a placement of a component is based on a comparison of the 3D model to the physical model and with respect to placements of other components based on knowledge in the relational model 610. Accordingly, edges used in an optimal path may correspond to placement of each component in an optimal arrangement.

In some examples, a path search algorithm may be implemented by traversing the process model 608 and the physical model concurrently, while saving a set of most probable arrangements of already explored components from the process model 608. In domains with clearly defined physical connections (e.g., pipes and flanges in an industrial process or wires and solder within a circuit), searchable possibilities are limited, such that the semantic model 612 may be created more efficiently than in domains with less clearly defined physical connections. In domains lacking clearly defined connections, the path search algorithm may utilize adjacency, relative location, and/or similar concepts to increase efficiency in creation of the semantic model 612.

In some examples, the path search algorithm may construct a set of partial matchings and descriptions of how components of the process model 608 correspond to parts of the physical model until all components of the process model 608 are matched to the physical model. An initial partial matching may be composed of components which have been tagged or otherwise indicated, such that their pose may be known with a relatively high precision. The algorithm may then create new partial matchings from a best existing partial matching until all parts from the process model 608 are matched. A new partial matching may be created by selecting an unmatched part in either the physical model 606 or process model 608, where the unmatched part is adjacent to or connected to a matched part. The selected unmatched part may be compared to unmatched parts in the other model adjacent to the corresponding matched part and which may, accordingly, correspond to the unmatched part. If any of the unmatched parts in the other model are probable matches based on a similarity of the stored 3D model to the specific location in the spatial database 606 and knowledge found in the relational model 610, a new partial matching with the new correspondence is created. The new partial matching will then have an updated likelihood or probability based on the probability of the new correspondence. Computations such as individual probability, connected components, and the like may be saved and reused as the same components are encountered in multiple possible matchings.

For example, the method of FIG. 8 begins at start block 802, and at block 804, a partial matching is constructed from initial labels (e.g., known components of the process or physical model). The partial matching is added to a priority queue at block 806. At block 808, the best partial match is popped from the priority queue and decision 810 determines whether there are unmatched components. If there are no unmatched components, the process ends at block 812. Where there are unmatched components, at block 814, an unexplored connection is selected from any matched part. The unexplored connection is followed through the physical model. At block 816, each part adjacent to the matched part is identified and, decision 818 determines whether there is another possible part. Where there are no other possible parts, the process returns to block 808 and the next best partial match is popped from the priority queue. Where there is another possible part, the process moves to consider the likelihood that the possible part exists at the new point based on the physical and relational model. A new partial matching is constructed at block 822 with the new part type by adding its likelihood to the old likelihood. Decision 824 determines whether the new partial match has a likelihood greater than a threshold value. Where the likelihood is greater than a threshold value, the new partial matching is added to the priority queue at block 826 before returning to decision 818 to identify other possible parts. Where the likelihood is not greater than the threshold value, the process returns to decision 818 without adding the new partial matching to the priority queue. The process continues on until a partial match is popped from the priority queue at block 808 with no unmatched components. Though the process of FIG. 8 is described with respect to the components shown in FIG. 6, the process may be similarly utilized to analyze the component shown in FIG. 1B or any combinations of components and models described herein.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A computer-implemented method of generating a model of a physical environment in a digital environment comprising:

generating, via a processor, a first graph database that represents the physical environment using image color data and depth data collected from the physical environment, the first graph database including spatial data about objects in the physical environment, wherein the image color data and the depth data are registered to each other and the generating of the first graph database comprises:

traversing, via the processor, the image data and the depth data and iteratively identifying the objects in the physical environment on an object-by-object basis;

for each object, generating, via the processor, a vertex in the first graph database that represents a physical model, each vertex representing an object in the physical model and a connection between objects in the physical model; and generating, via the processor, edges in the first graph database physical model, the edges representing relationships between objects;

generating, via the processor, a second graph database that represents the physical environment using a digitized diagram of the physical environment, the generating comprising:

extracting, via the processor, from the digitized diagram, components in the physical environment and interconnections between the components reflecting connections between the components in the physical environment;

generating, via the processor, a vertex in the second graph database that represents a process model, the vertex representing each component; and generating, via the processor, edges in the second graph database, the edges representing relationships between components;

generating, via the processor, a third graph database that represents the physical environment by:

iterating, via the processor, through all vertices and edges in the first graph database and all vertices and edges in the second graph database;

determining, via the processor, that a vertex in the second graph database matches a vertex in the first graph database by performing a graph matching operation based on the first graph database and second graph database;

generating, via the processor, a vertex in the third graph database that represents the vertex in the second graph database; and modifying, via the processor, the vertex in the third graph database by performing an optimizing operation to modify a configuration of the vertex in the third graph database based on a probabilistic constraint of the vertex in the third graph database;

generating, via the processor, a three dimensional virtual model of the physical environment using the third graph database and component models stored in memory to construct three dimensional operational virtual objects in the virtual model that represent the objects in the physical environment and simulate real-world characteristics of the objects in the physical environment; and transmitting, via the processor, the virtual model to a computing device to enable digital interaction with the three dimensional virtual model.

2. The computer-implemented method of claim 1, wherein the image color data and the depth data are determined from a scan of the physical environment collecting the spatial data about the objects within the physical environment.

3. The computer-implemented method of claim 2, wherein the scan of the physical environment includes one or more of a light detection and ranging (LiDAR) scan of the physical environment, a sonar scan of the physical environment, or an infrared (IR) scan of the physical environment.

4. The computer-implemented method of claim 1, wherein the digitized diagram comprises one or more of a piping and instrumentation diagram (P&ID), a two-dimensional computer aided design (CAD) model, or a map of the physical environment.

5. The computer-implemented method of claim 1, wherein the third graph database comprises one or more component attributes associated with at least one component, the one or more component attributes comprising one or more of pose, size, pressure rating, direction of process flow, or shape of the components.

6. A system for generating a three dimensional virtual model of a physical environment, the system comprising:

one or more processors;

one or more memories configured to store:

a first graph database that represents a first model of the physical environment comprising spatial data about objects in the physical environment, the first graph database storing vertices representing the objects in the physical environment and the spatial data comprising image data and depth data registered to each other;

a second graph database that represents a second model of the physical environment, the second graph database storing vertices that represent components extracted from a digitized diagram of the physical environment and at least one edge that represent a relationship between two components;

a relational model comprising probability distributions regarding attributes of at least some of the components in the physical environment and relationships between the components within the physical environment;

component models corresponding to the objects in the physical environment, the component models comprising at least one of parametric models of the objects, standardized models of the objects, combinations of parametric models and standardized models, or polygonal meshes; and instructions, that when executed by the one or more processors, cause operations to be performed, the operations comprising:

generating a third graph database that represents a third model of the physical environment by repeatedly:

determining a correspondence point between a vertex in the first graph database and a vertex in the second graph database;

traversing, along a direction, from the correspondence point to a next vertex in the first graph database and a next vertex in the second graph database;

determining that the next vertex in the second graph database matches the next vertex in the first graph database by performing a graph matching operation based on the first graph database and second graph database, generating a vertex in the third graph database that represents the vertex in the second graph database; and modifying the vertex in the third graph database by performing an optimizing operation to modify a configuration of the vertex in the third graph database based on a probabilistic constraint of the vertex in the third graph database;

generating the three dimensional virtual model of the physical environment using the third graph database, the probability distributions regarding the attributes of the at least some of the components in the relational model, and the component models, the generating comprising selecting and placing some or all of the component models in the three dimensional virtual model to construct interactive objects that simulate real-world characteristics of the objects in the physical environment; and transmitting the virtual model to a computing device to enable digital interaction with the three dimensional virtual model.

7. The system of claim 6, wherein the digitized diagram comprises one or more of a piping and instrumentation diagram of the physical environment, a description of the physical environment, a map of the physical environment, or a schematic of the physical environment.

8. The system of claim 6, wherein the image color and depth data are derived from a scan of the physical environment collecting the spatial data about the objects within the physical environment.

9. The system of claim 8, wherein the scan of the physical environment includes one or more of a photo aligned light detection and radar (LiDAR) scan of the physical environment, a sonar scan of the physical environment, or an infrared (IR) scan of the physical environment.

10. One or more non-transitory computer readable media encoded with instructions which, when executed by one or more processors, cause the one or more processors to perform a process comprising:

generating a physical model of a physical environment using image color data and depth data collected from the physical environment, the physical model including spatial data about objects in the physical environment, wherein the generating of the physical model comprises:

traversing the image color data and the depth data and iteratively identifying the objects in the physical environment on an object-by-object basis; and for each object, generating a vertex in a first graph database that represents the physical model, the vertex representing the object;

generating a process model of the physical environment using a digitized diagram of the physical environment, the generating comprising:

extracting, from the digitized diagram, components in the physical environment and interconnections between the components reflecting connections between the components in the physical environment and storing vertices that represent the components and the interconnections in a second graph database that represents the process model;

generating a semantic model of the physical environment by:

iterating through all vertices in the physical model and in the process model;

determining that a vertex in the process model matches a vertex in the physical model by performing a graph matching operation based on the process model and physical model;

generating a vertex in a third graph database that represents the semantic model, the vertex in the third graph database representing the vertex in the process model; and modifying the vertex in the semantic model by performing an optimizing operation to modify a configuration of the vertex in the semantic model based on a probabilistic constraint of the vertex in the semantic model;

generating a three dimensional virtual model of the physical environment using the semantic model and a model library including models corresponding to the components, wherein the models construct three dimensional operational virtual objects in the three dimensional virtual model that represent the objects in the physical environment and simulate real-world characteristics of the objects in the physical environment and consequences of the interactions; and transmitting the three dimensional virtual model to a computing device to enable digital interaction with the three dimensional virtual model.

11. The one or more non-transitory computer readable media of claim 10, wherein the image color and depth data are derived from a scan of the physical environment collecting the spatial data about the objects within the physical environment.

12. The one or more non-transitory computer readable media of claim 11, wherein the scan of the physical environment includes one or more of a light detection and ranging (LiDAR) scan of the physical environment, a sonar scan of the physical environment, or an infrared (IR) scan of the physical environment.

13. The one or more non-transitory computer readable media of claim 10, wherein the digitized diagram comprises one or more of a piping and instrumentation diagram (P&ID), a two-dimensional computer aided design (CAD) model, or a map of the physical environment.

14. The one or more non-transitory computer readable media of claim 10, wherein the third graph database comprises a component attribute associated with at least one component, the component attribute including one or more of pose, size, pressure rating, direction of process flow, or shape of the components.

15. The one or more non-transitory computer readable media of claim 10, wherein the semantic model is generated using a relational model associated with the physical environment, the relational model comprising probability distributions regarding component attributes of at least some of the components and relationships between the components.

16. The one or more non-transitory computer readable media of claim 15, wherein the process further comprises generating the relational model.

17. The computer-implemented method of claim 1, wherein the component models comprise at least one of parametric models of the objects, standardized models of the objects, combinations of parametric models and standardized models, or polygonal meshes.

18. The system of claim 6, further comprising based on a determination that the next vertex in the second graph database does not match the next vertex in the first graph database, determining whether a vertex is to be stored in the third graph database based on information in the relational model.

19. A computer implemented method comprising:

registering, by a processor, image color data captured by a camera with depth data captured by a depth scan of a physical environment;

analyzing, by the processor, the image color data by a machine learned algorithm to detect and localize components within a two dimensional representation of the physical environment;

analyzing, by the processor, with a machine learned model the two-dimensional representation of the physical environment and the depth data to identify the components and estimate a pose of the components in the physical environment;

generating, by the processor, a spatial database forming a physical model of the physical environment, the spatial database including the components of the physical environment;

generating, by the processor, a digital process and instrumentation (P&ID) file by extracting symbols and annotations from a P&ID diagram;

modeling, by the processor, the digital P&ID file as a process model, wherein the process model comprises a graph database comprising a plurality of vertices and a plurality of edges spanning between the plurality of vertices, wherein each vertex of the plurality of the vertices represents a component within the physical environment and each edge of the plurality of edges represent a relationship between two components, wherein the graph database further comprises unique identifiers for the plurality of vertices and the plurality of edges;

optimizing, by the processor, by graph matching between the graph database of the processing model and the spatial database of the physical model and using information in a relational model;

generating, by the processor, a semantic model based on the spatial database and the graph database, wherein the semantic model comprises digital components representative of each component within the physical environment;

modifying, by the processor, the semantic model by performing an optimizing operation to modify a configuration a vertex of the semantic model based on a probabilistic constraint of the vertex of the semantic model; and generating, by the processor, a three dimensional virtual model of the physical environment using the semantic model and a computer aided (CAD) library, wherein the CAD library comprises mathematical representations of physical components within the physical environment and the mathematical representations are modified to match specific features of the physical components and construct three dimensional interactive components in the three dimensional virtual model; and outputting, by the processor, the three dimensional virtual model to a display to allow a user to navigate through and interact with the three dimensional interactive components in the three dimensional virtual model.

* * * * *